United States Patent
Vijayanarayanan

(10) Patent No.: US 10,320,564 B2
(45) Date of Patent: Jun. 11, 2019

(54) SYSTEM AND METHOD FOR GENERATING AND DEPOSITING KEYS FOR MULTI-POINT AUTHENTICATION

(71) Applicant: Autnhive Corporation, Oakville (CA)

(72) Inventor: Devi Selva Kumar Vijayanarayanan, Oakville (CA)

(73) Assignee: Autnhive Corporation, Oakville (CA)

(*) Notice: Subject to any disclaimer, the term of this patent is extended or adjusted under 35 U.S.C. 154(b) by 0 days.

(21) Appl. No.: 16/165,606

(22) Filed: Oct. 19, 2018

(65) Prior Publication Data

US 2019/0123901 A1 Apr. 25, 2019

Related U.S. Application Data

(60) Provisional application No. 62/574,285, filed on Oct. 19, 2017.

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 9/14* | (2006.01) | |

(52) U.S. Cl.
CPC .......... *H04L 9/0894* (2013.01); *H04L 9/0866* (2013.01); *H04L 9/0891* (2013.01); *H04L 9/14* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 6,230,269 B1 | 5/2001 | Spies et al. | |
| 6,847,995 B1 | 1/2005 | Hubbard et al. | |
| 6,962,530 B2 | 11/2005 | Jackson | |
| 7,694,130 B1* | 4/2010 | Martinez | H04L 63/0846 713/155 |
| 7,802,097 B2* | 9/2010 | May | H04L 63/062 713/171 |
| 8,214,884 B2* | 7/2012 | Xia | H04L 63/0281 709/217 |
| 8,356,180 B2 | 1/2013 | Garcia Morchon et al. | |

(Continued)

OTHER PUBLICATIONS

International Search Report and Written Opinion dated Mar. 21, 2019 in connection with International Application No. PCT/IB2018/058165, 8 pages.

*Primary Examiner* — Maung T Lwin
(74) *Attorney, Agent, or Firm* — Baker & McKenzie, LLP

(57) ABSTRACT

The present invention is an platform and/or agnostic authentication method and system operable to authenticate users, data, documents, device and transactions. Embodiments of the present invention may be operable with any client system. The authentication method and system are operable to disburse unique portions of anonymous login related information amongst multiple devices. These devices and the disburse unique portions of anonymous login information are utilized by the solution to authenticate users, data, documents, device and transactions. Login-related information is not stored in any portion of the solution, users and devices are anonymously authenticated. The solution also permits a user to access secured portions of the client system through a semi-autonomous process and without having to reveal the user's key.

20 Claims, 27 Drawing Sheets

(56) References Cited

U.S. PATENT DOCUMENTS

| | | |
|---|---|---|
| 8,776,190 B1 * | 7/2014 | Cavage ................... G06F 21/62 |
| | | 380/255 |
| 8,989,706 B2 | 3/2015 | Ananthanarayanan et al. |
| 9,053,306 B2 | 6/2015 | Yoshigaki et al. |
| 2006/0206926 A1 * | 9/2006 | Luo ......................... H04L 12/22 |
| | | 726/5 |
| 2007/0150744 A1 * | 6/2007 | Cheng ................... G06F 21/335 |
| | | 713/185 |
| 2007/0300031 A1 * | 12/2007 | Jevans ................... G06F 21/60 |
| | | 711/166 |
| 2007/0300052 A1 * | 12/2007 | Jevans ................... G06F 21/34 |
| | | 713/1 |
| 2009/0158394 A1 | 6/2009 | Oh et al. |
| 2010/0070757 A1 * | 3/2010 | Martinez ............ H04L 63/0846 |
| | | 713/155 |
| 2011/0246779 A1 | 10/2011 | Teranishi |
| 2015/0256542 A1 * | 9/2015 | Alasingara Bhattachar ................ |
| | | G06F 21/31 |
| | | 713/182 |
| 2017/0149796 A1 | 5/2017 | Gvili |

\* cited by examiner

SYSTEM AND METHOD FOR GENERATING AND DEPOSITING KEYS FOR MULTI-POINT AUTHENTICATION

CROSS-REFERENCE TO RELATED APPLICATIONS

This application claims priority to U.S. Provisional Application No. 62/574,285, filed Oct. 19, 2017, all the disclosures of which are hereby incorporated by reference in their entirety for all purposes.

FIELD OF INVENTION

This invention relates in general to the field of network or system authentication and more particularly to authentication of a user of a network and data transferred to and from said user via the network or system.

BACKGROUND OF THE INVENTION

All organizations are challenged with securing their data from potential security breaches. Only through data security can an organization ensure that only authorized persons are granted access to their systems across multiple technologies. Thus, data security and authorized system access are two of the major challenges that organization must wrestle with today.

Presently there are many systems and methods that effect various types of authentication of users of systems and networks. These various types of authentication have differing levels of security and reliability. The following are examples of types of prior art authentication methods for systems and networks.

U.S. Pat. No. 6,962,530 issued to IGT on Nov. 8, 2005, discloses an architecture and method for a gaming-specific platform that features secure storage and verification of game code and other data. The method further provides a user with the ability to securely exchange data with a computerized wagering game system. This invention does not involve spreading out login information amongst multiple devices.

U.S. Pat. No. 9,053,306 issued to NEC Solution Innovators, Ltd. on Jun. 9, 2015, discloses an authentication system operable to calculate a first and a second hash value from the login information inputted by a user. A session will be established between a server and a terminal if the first and second hash values match each other. This invention does not involve holding back portions of the encrypted details.

U.S. Pat. No. 8,989,706 issued to Microsoft Corporation on Mar. 24, 2015, discloses systems, method and/or techniques that relate to automated secure pairing for devices, relating to parallel downloads of content using devices. The tools for pairing the devices may perform authentication protocols based on addresses and on keys. This invention does not involve holding back portions of the encrypted details.

U.S. Pat. No. 8,356,180 issued to Koninklijke Philips Electronics N.V. on Jan. 15, 2013, discloses a method for multi-dimensional identification, authentication, authorization and key distribution relation to secure communications at a deep common security domain. This invention cannot authenticate a transaction without the user revealing the user's key to the system.

U.S. Pat. No. 6,847,995 issued to United Devices, Inc. on Jan. 25, 2005, discloses a security architecture and an associated method for providing secure transmissions within distributed processing systems. This invention does not involve multi-layer encryption or holding back portions of the encrypted details.

U.S. Patent Application Publication No. 2017/0149796 filed by Yaron Gvili on Nov. 23, 2016, discloses a system and technique for allowing a third party verifier to verify aspects of secured data, or the successful communication thereof. This invention does not involve multi-layer encryption or holding back portions of the encrypted details.

U.S. Patent Application Publication No. 2011/0246779 filed by Isamu Teranishi on Jun. 6, 2011, discloses a zero-knowledge proof system that allows a discrete-logarithm zero-knowledge proof. This invention does not involve multi-layer encryption or holding back portions of the encrypted details.

The prior art encryption methods and systems are particularly vulnerable to the intervention of third parties into the transfer of data and information between a user and a user and a system or network. If the third party can access data in transit, it can extrapolate login details from such information. If all of the login details are available from data transferred between the user and the system then the third party may be able to login to the system using the user's login details. This creates a security hazard for present day systems if known authentication methods and systems are utilized.

What is needed is an authentication method and system that will protect a user's login details from being obtained through third party interference with transmitted data.

SUMMARY OF THE INVENTION

In one aspect, the present disclosure relates to an authentication method and system operable to authenticate users, data, documents, device and transactions. Embodiments of the present may be operable with any system or network and is platform agnostic. The authentication method and system are operable to securely create and disburse of unique portions of login related information amongst multiple devices. The disbursed portions of login related information are utilized by the system to authenticate users, data, documents, device and transactions without revealing the login related information to the system. This system protects login related information at creation, transmission, storage and Authentication. In another aspect, the present disclosure relates to authentication of without revealing the keys to the system.

In another aspect, the present disclosure relates to a system and method for authentication of a user comprising of: a client system incorporating secure portions; a user system operable for the user to access the client system and to store portions of login information; a verification system operable to receive and transmit information to and from the client system, and the user system; and a synchronization system incorporating multiple synchronization elements wherein unique portions of the login related information for the user can be bi-laterally transmitted with the verification system, and be stored accessed and used.

In yet another aspect, the present disclosure relates to a system and method for authentication of user interaction with a client system comprising of: a user device; a client system; a client display unit; and a client verification system; the user device, client system, client display unit and client verification system being operable to authentication the user interaction with the client system devoid of the user revealing a user key to the system.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
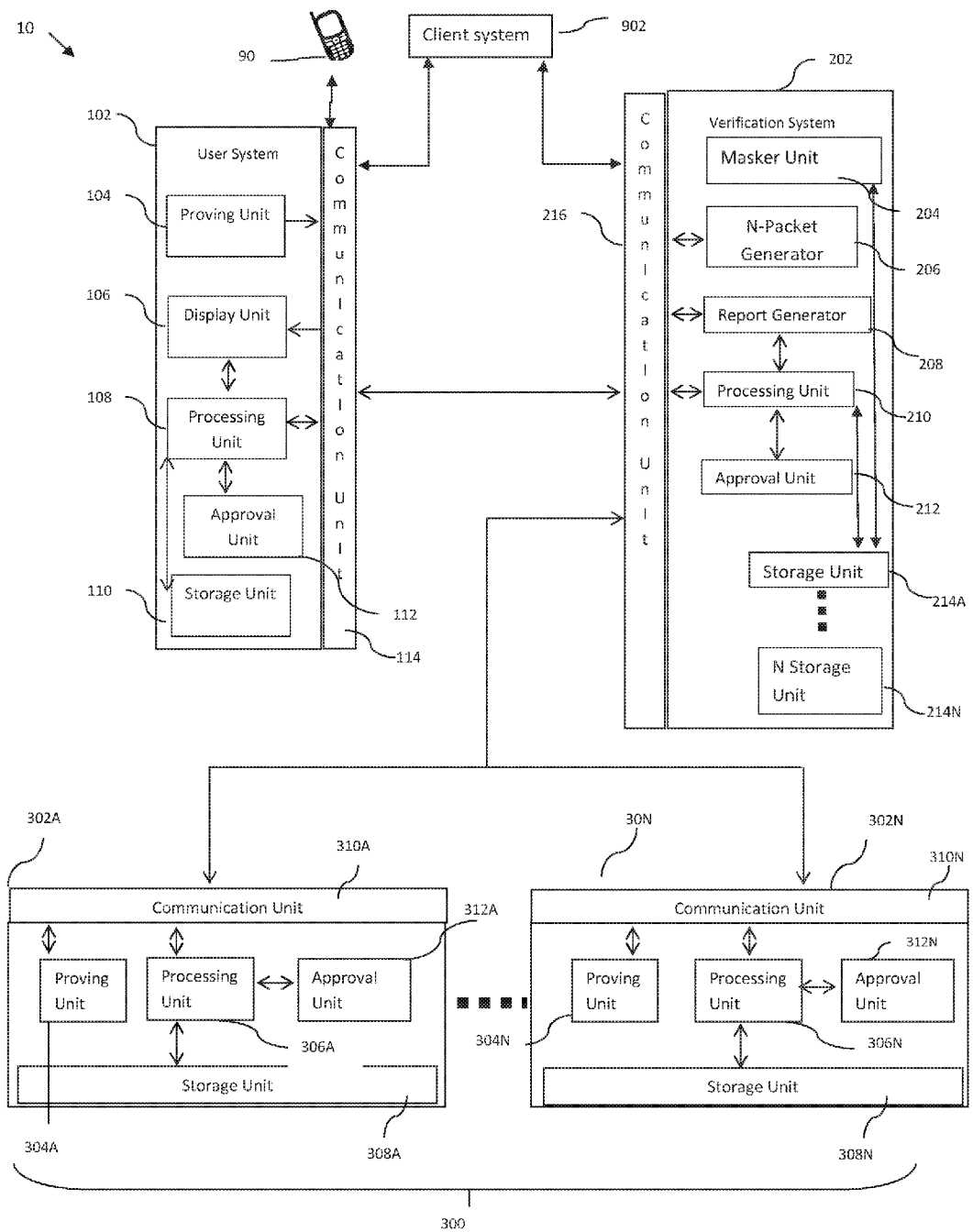
FIG. 1 is a system drawing showing an embodiment of the authentication system of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is an authentication method and system operable to authenticate users, data, documents, devices and transactions. Embodiments of the present invention may be operable with any system or network of any organization or individual. The authentication method and system are operable to disburse unique portions of login related information amongst multiple devices. The disbursed portions of login related information are utilized by the system to authenticate users, data, documents, devices and transactions without revealing the login related information to the system. The login related information is encrypted and/or hashed through multi-layer encryption and/or hashing, and some of the encrypted and/or hashed details are held back. The devices wherein login related information is stored will all be utilized in the authentication method and system. Login related information provided to a user is not revealed to and/or stored in the system or any user device. The authentication of data, documents, devices and transactions does not require a key to be revealed to the system.

Any reference herein to "client system" means either the network or system of an organization or individual. Any reference herein to "user device" means a device utilized by a user to login to the client system, such as a laptop, a tablet, a cell phone, a smart phone, a desktop computer, smart watch, a computimg device, whereby a user can login to the client system or any other device which requires a secure login. Any reference to the "transfer of information" between a user and the client system can include any creation, transfer or storage of information occurring in relation to the system.

For clarity, when reference is made to any unit or element of the authentication system "accessing" another unit or element, this may involve any of the following: (i) the unit or element accessing the other unit or element to obtain information therefrom; or (ii) the unit or element sending a request to the other unit or element for information to be retrieved or generated, and once such information is retrieved or generated in response to the request, such information can be sent to the unit or element that sent the request.

When a user logs into a client system using a user device, the creation, transfer, storage or authentication of login related information between the user device and the client system can be vulnerable to attack by a third party. As a result of the third party's attack on user device or client system, during the creation, transfer, storage and/or authentication of login related information between, the third party may obtain and/or use such information for nefarious purposes. For example, the third party may login to the client system using the login details they have obtained and thereby achieve unauthorized access to the client system or move laterally to systems connected to the client system by obtaining more login related information from the client system or otherwise. As another example, the third party may utilize the data, documents or transaction information obtained due to the attack for a variety of unauthorized purposes i.e., dissemination of the information to other parties, use of the information to obtain a market advantage, holding the information hostage for a ransom, espionage, subversion etc.). The present invention decreases the vulnerability of a client system to such unauthorized usage of the client system or data, documents or transaction information created, transferred and/or stored between such client system and a user device.

The method of the present invention involves a user utilizing a user device to login to the client system of an organization or person. The login related information will be hashed and/or encrypted through a single or multi-layer hashing and/or encryption process(es). In particular at least a portion of the encrypted and/or hashed key may be generated and stored in the user's device. Other unique portions of the login related information will be stored in other devices in the environment. The disbursement of unique portions of the login related information amongst multiple devices means a third party who accesses information transferring between the client system and the user's device will not be able to obtain any or all of the information required for a successful login to the client system.

Moreover, in one aspect of the current system, to authenticate data documents, devices, transactions and/or a user, the user's device will need to prove to the client system that it has valid keys and/or that the device has been previously authenticated This will be achieved by the present invention without the user device having to reveal a key or keys to the client system. Thus, the authentication of data, documents, devices, transaction and users can occur without the user having to reveal his or her key to the client system.

The login related information will be created uniquely and will not be stored and/or transmitted; this along with the user device assisted multipoint authentication prevents unauthorized third party access to the client system.

As most prior art authentication systems involve the creating, storing, transfer and single point authentication of login related information between a user's device and a client system, the prior art systems are vulnerable to such information being compromised by third parties. Once such information is obtained by a third party, the information can be used to login at a single authentication point to the system network without authorization, or unauthorized use of the data, documents or transaction information. The present invention offers a benefit over the prior art systems in that it is not vulnerable to such third party access to information that would allow unauthorized access to a client system, or to data, documents or transaction information. The authentication system of the present invention addresses the problem of prior art authentications that can be compromised at creation, storage, transit and authentication point.

As an example of another benefit of the present invention over the prior art system is that prior art systems are not generally operable with any type of client system, or with any type of user device. The present invention provides an organization with a secure authentication system that will provide the necessary secure access to a user to access the organizations' data across any platform, solution or environment. The present invention can be implemented by any organization for use with any type of client system, and with any user device on any platform.

Yet another example of a benefit of the present invention over the prior art is that the present invention is operable to undertake hive authorization of devices within an environment. For example, multiple mobile and/or storage devices across geo-temporal zones can be authorized in the course of hive authorization. Prior art systems are not operable to undertake hive authorization across geo-temporal zones.

Embodiments of the present invention may incorporate multiple components operable to authenticate a user for the purpose of a user login to a client system having secure portions therein, or for the purpose of the user accessing the secure portions of such system. For example, one embodiment of the present invention may incorporate three main components as follows: (1) Synchronized Multi-Faceted Authentication (SMFA); (2) Interactive Semi-Manual Authentication (ISMA); (3) Transaction Authentication. To provide an example of such an embodiment of the present invention these three components of an embodiment of the present invention all described below. A skilled reader will recognize that other configurations of the present invention are possible, including configurations that only include one or two of the three components described below, or configurations that incorporate other components.

Synchronized Multi-Faceted Authentication (SMFA)

The authentication process for a user of the present invention authentication method and system operates so that the encrypted and or hashed portions of random multi-unit login related information are disbursed amongst devices (e.g., user and/or system devices and storage units) and all of such or more of such devices must be utilized to authenticate the user.

Therefore, if login data is compromised at creation, transit, storage or at authentication, such as by unauthorized access by a third party, only an encrypted and or hashed partial portion of the time sensitive random login related information of the unknown user(s) will be obtained this data will be unusable to authenticate the user.

More specifically, the present operable to require a user to engage in a challenge, such as, a static challenge that may be a pin and/or pattern challenge, an animated and/or non-animated challenge, a graphical and/or non-graphical challenge, a two dimensional and/or three dimensional challenge, a moving and/or static gamified challenge, and/or a non-gamified interface challenge, in order to login the client system. The system may choose a series its and may use these to generate a challenge. Each unit is randomly assigned multiple digits, that may change at each login event. A user may select multiple challenges in the same authentication event and in any subsequent authentication events.

The series of units chosen during the challenge are divided by the authentication system into multiple unique system portions. The units in each unit portion may be hashed or encrypted individually to generate unit results, and then the units in each system portion are hashed and/or encrypted collectively to generate system portion results. The number of hashes and/or encryptions applied to each unit in a system portion and to each system portion can vary.

Portions of the hashed and/or encrypted results are stored in different devices of the distributed architecture of the client or other system and a portion is stored in the user's device. For example, portions of the hashed and/or encrypted results may be stored in multiple user and system devices.

All of the client system devices containing hashed and/or encrypted partial data, as well as the user device, must validate themselves. Once devices are authenticated they might then co-authenticate the user.

The present authentication system invention is platform agnostic, so it can be used with any client system.

Interactive Semi-Manual Authentication (ISMA)

The authentication process for a user of the present invention operates so that the login information is encrypted and/or hashed using multi-layer encryption and/or hashing functions. The portions of random encryption and/or hashing details that are held back and manually transmitted and are not stored in the client system, or in the user device, thereby decreasing the possibility of compromise during transmission, storage or authentication.

The system of the present invention provides a key (i.e., key#1) to the mobile device. All keys in the present invention are encrypted and/or hashed using multi-layer encryption and/or hashing functions.

The encrypted key is required to be used in the authentication process of the present invention, and therefore the user must first authenticate using the SMFA process described herein, and thereby validate the key and authenticate the user's device.

The system will generate a challenge based on random encrypted keys that will change at each login vent. The authenticated user will use their authenticated device to scan the challenge. At the end of this process part or whole portions of the random encrypted key will be sent to the user device.

In some embodiments of re present invention there may be another set of encrypted random keys that may be generated by the user device that will also change at each login event. Multiple keys that can be combined to form an encrypted shared secret key; portions of or the entire encrypted shared secret key will be sent to the client system of the organization that is requesting authentication of the user.

Multiple layers of encryption may be generated by the user device. Such encryption may be applied to elements individually or collectively. For example, random three or more digits (that may change during each login event) along with salt and iv can be generated by the user device, or other types of encryption and/or hashing may be applied. Another layer of encryption may be added collectively to the prior encryption.

Multiple random characters will be removed from the package that results from the multiple layers of encryption. For example, six random characters may be removed from the package. The multiple random digits and characters will be provided to the user and the encrypted details are sent to the client system requesting authentication of the user device.

The client system requesting authentication of the user device will challenge the user to provide the information given to the user device. Only upon the user providing such information will the client system be able to authenticate the user. This process reduces the possibility of a third party intercepting, guessing or knowing the user's login information.

When the user is authenticated the session will be authenticated through time and geo-based access code. For example, the geo-based access code may be a token or any other type of geo-based access code. The geo-based access code may be invalidated if the time expires or the geo aspect is invalidated. For example, the geo aspect may be invalidated if the user is not located within the geo-location relating to the geo-based access code.

Transaction Authentication

The authentication process for a user of the present invention authentication system operates so that the transactions are authenticated without the user having to reveal his or her key to the client system. The client system does not know the user key or if the user has a key. The user device has to prove to the system that it has valid keys and that the user and device have been authenticated, without revealing the key to the system. In order to achieve this the user device will have to authenticate using the SMFA process described herein and/or the ISMA process described herein. Once the user device is authenticated, the user device may use a random temporary key it has or that it has received.

The system will generate a challenge. This challenge may be secured using features, such as, multi-layer encryption, digital signature and or hashing. The secured package is sent to the user device requesting authentication. The user device will verify the package and may use the decryption key provided to the display or solve the challenge.

As an example, one embodiment of the present invention may be operable such that the system will generate multiple random digit alpha numeric codes with one or more digits being blank, the corresponding alphabet or numeral to be filled-in to the blank will be also sent to the user with the challenge in the ISMA process. For example, the system may generate six more multiple random digit alpha numeric codes, or any other number of random digit alpha numeric codes.

The system will generate and encrypt the six or more random digit alphanumeric code as well as other elements. For example, the system may encrypt the six or more random digit alphanumeric code, Additional encryption and security features (which may include but not limited to salt, iv, secure keys etc.) may also be applied by the client system. The system will then add a digital signature to the results of the encryptions. This encrypted & signed package is then sent to the user device requesting to be authenticated.

The user device will verify the digital signature and then use the decryption key provided to recreate the six or more digit alpha numeric code along with corresponding alphabets or numerals.

The user device then encrypts the recreated information, along with the security features. The user device will then add a digital signature to the results of the encryption. This encrypted and signed package is then sent to the client system engaged in the authentication process.

The client system receives the message from the user device, and upon receipt will verify the digital signature, decrypt the message and compares the message with the sent message. If the comparison shows that the received message is the same as the sent message then the client system knows that the user has the required key When the user device is authenticated the session will be authenticated through time and geo-based access codes, these access codes will be invalidated if the time expires or the geo is invalidated, as previously discussed herein.

A skilled reader will recognize that the method and system for authentication of the present invention may be implemented in a variety of manners. FIGS. 1-17 provide some examples of embodiments of the present invention, and these are described herein.

As shown in FIG. 1, the authentication system incorporates many elements including a client system, a user system, a verification system, and multiple storage units. The authentication system is operable to achieve many functions including proving and verifying a user's login.

The user system 102 is used by the user to login to the client system 902. The user system is operable to engage in verifying the user's identity as well as other activities, as described herein. The user's identity must be verified by the client system in order for the user to gain access to the secured area of the client system. The verification system 202 is operable to engage in verifying the identity of the user to the client system.

When the user, through the user device 90, wants to access a secured area of the client system, the user will have to first prove the user's identity to the client system. Once the client system receives verification of the identity of the user, the system can then permit the user to access the secure contents of the client system.

The user uses the user system to prove its identity and to gain access to the secured area of the client system. The verification system 202 is operable to verify the authenticity of the user's identity. The synchronization system 300 is a collection of one or more synchronization elements 302A . . . 302N, operable to function in a synchronized manner to approve the authenticity of user's identity.

The user system may incorporate multiple elements. In one embodiment of the present invention the user system may incorporate a proving unit 104, a display unit 106, a processing unit 108, an approval unit 112, a storage unit 110 and a communications unit 114. The proving unit is operable to prove the initial identity of the user system 102 to the verification system. The display unit is operable to display information to a user, for example, such as a challenge or any other information transferred from the client system, the verification system or any other system or element of the present invention to the user system. The display unit is further operable to display information generated by the client system to the user. The display unit may further be connected to an input unit, or have a touch screen or other input operability, whereby a user can input information. The information inputted by the user may be displayed on the display unit, or may otherwise be collected by the user system and stored, transferred to the client system or another system or element of the authentication system, or processed by the user system. The processing unit 108 will be responsible for all the processing capacity within the system. The approval unit 112 will be responsible for accessing the challenge and response and providing a result and the storage unit will be responsible for storing both temporary and permanent data. The communication unit 114 is responsible for all external communications.

The verification system 202 may incorporate multiple elements. In one embodiment of the present invention the verification system may incorporate a masker unit 204, a N-packet generator 206, a report generator 208, a processing unit 210, an approval unit 212, one or more storage units 214A . . . 214N, and communications unit 216. The masker unit is operable to generate one or more unique non-identifying identifiers for the client system and the user system. The processing unit 210 is operable to processing of information and data as required by the authentication system. The approval unit 212 is operable to access the responses received internally in the system and providing a result that can be sent to the processing unit or sent to a receiver that is external to the system via a communication unit. The one or more storage units are operable to store both temporary and permanent data. The N-packet generator 206 is operable to generate packets of authentication information. The communication unit 216 is operable to receive and transfer all communications with all elements of the authentication system that are external to the verification system (i.e., the client system, the user system, etc.).

A skilled reader will recognize that in embodiments of the present invention some or all of the units described as elements of the verification system in FIG. 1 may be incorporated within other systems or elements of the authentication system, such as the client system. In some embodiments of the present invention some or all of the units described as elements of the verification system in FIG. 1 may be standalone elements that are not incorporated in any system of the authentication system, but are generally incorporated in the authentication system.

The synchronization system 300 may incorporate one or more synchronization elements 302A . . . 302N, and each synchronization element may incorporate multiple units. In one embodiment of the present invention at least two synchronization elements may incorporate a proving unit 304A . . . 304N, a storage unit 308A . . . 308N, a processing unit 306A . . . 306N, an approval unit 312A . . . 312N, and a communications unit 310A . . . 310N. The proving unit 304A is operable to prove the initial identity of the synchronization system 300 to the verification system 202.

Communication between the user system, the verification system and the synchronization elements is received by and transferred from the communication unit of such system and/or elements. All such communication between the systems and/or elements may be secured by the use of one or more masking functions, the one or more masking functions may include, hashing and/or encryption.

Figure 2:
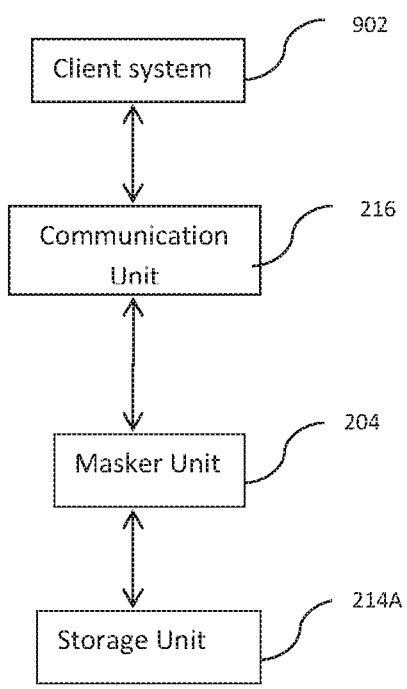
FIG. 2 is a system drawing showing a configuration of elements operable to undertake a transfer of data between the client system and the verification system of an embodiment of the present invention.

As shown in FIG. 2, data may be transferred between the client system 902 and a masker unit 204 of the verification system via the communication unit 216 of the verification system. During the initial communication between the client system and the verification system relating to the set-up of a new user who wants to use the client system, the client system may communicate with the masker unit of the verification system to request credentials required for the new user to establish a secure connection with the client system. The masker unit generates unique secured credentials the client system can use to establish a link between the client system and the verification system. These unique credentials may include for example a client ID, or other forms of credentials.

When the trusted connection is established between the client system and the verification system, the masker unit performs a process, such as, a calculation, an algorithm or another type of process that will generate a unique non-identifying identifier that is a secret for the user. The unique non-identifying identifier may be stored in one of the storage units 214A (or any of storage units 214A . . . 214N) incorporated in the verification system.

The masker unit may use a masking function such as hashing, encryption, and or some other masking function to render the non-identifying identifier secure. The client system may also provide the verification system with a list of all available synchronization elements. In embodiments of the present invention, one or more of the synchronization elements may be stored in one or more of the storage units 214A . . . 214N of the verification system.

Figure 3:
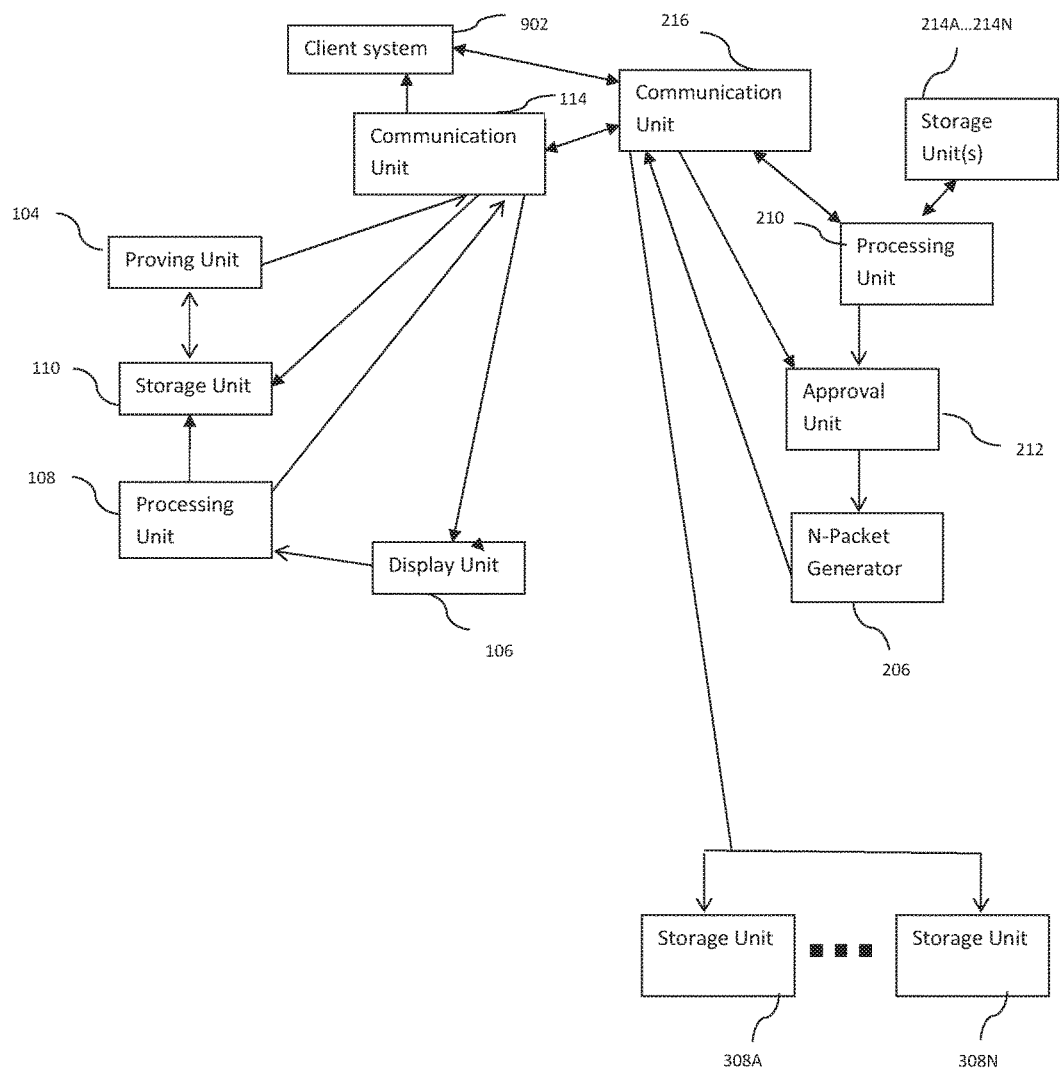
FIG. 3 is a system drawing showing a configuration of elements operable to undertake a registration process of an embodiment of the present invention.

As shown in FIG. 3, the registration process of the present invention may involve the operation of elements of the authentication system as required during the initial interaction of the user with the authentication system, in order for the user to register with the client system. All communications between the client system, elements of the user system, elements of the verification system and elements of the synchronization system are via the communication units of the user system, the verification system and the synchronization system, as shown in FIG. 3. The user must register with the client system to be authorized to access the secure portions of the client system. During the initial registration the proving unit 104 accesses one or more storage units 110 of the client system to retrieve proving information. The proving information may include a non-identifying identifier generated by the masker unit, a secret that has also been generated by the masker unit, and may also include information that may identify the user device, a unique application number, and or other information relating to the user, for example biometric information (e.g., the user's fingerprint, the user's retina scan, or other biometric information of the user), usage information etc. Once the proving unit obtains all of the proving information, the proving information may be stored in one or more of the storage units of the user system.

The proving information that has been obtained by the proving unit 104 is securely sent via the communication unit 114 of the user system to the processing unit 210 of the verification system. The processing unit 210 retrieves information for the user, via the communications unit 216 of the verification system, from one or more of the storage units 214A . . . 214N of the verification system. The processing unit 210 combines the information it receives from the client system with the information it retrieves from the one or more storage units of the verification system to create a package of information. The processing unit sends such package of information to the approval unit 212.

The approval unit 212 compares the values of the package of information it receives from the processing unit with information stored in the one or more storage units 214A . . . 214N of the verification system, that was previously received from the client system. If the comparison is successful the approval unit will accept the connection with the user system. If the comparison is not successful the approval unit 212 will deny the connection with the user system. The results of the approval system are sent to the N-packet generator 206.

If the connection with the user system is not approved, the operation of the authentication system to attempt to register the user will end. In one embodiment of the current invention, if the connection with the user system is approved, then the N-packet generator will generate a random challenge. The random challenge may include multiple packets (N-packets). Each N-packet contains multiple random numeric or alphanumeric/other characters (N-RANC).

The N-packets are securely sent to the display unit 106 of the user system. Embodiments of the present invention may apply multi-layer of protection, including, but not limited to encryption, hashing and/or digital signature to provide security to the N-packets in transit between the N-packet generator and the display unit, for example, the multi-layer protection of both the N-RNAC and the N-packets prior to transit. In other embodiment of the present invention N packets could be generated by an element of the user system or a different system with or without N-RNAC. The user interacts with this element to generate an OY packet.

The display unit 106 receives the N-packets and displays the information incorporated in the N-packets to the user. From the N-packets displayed the user enters one or more N-packets, and thereby selects the N-RANC associated with the chosen N-packets. For ease of reference the N-packets chosen by the user are the Y-packets herein. The order in which the Y-packets are chosen by the user is retained to become Ordered Y-packet (OY-Packet) The OY-Packets are sent by the display unit 106 to the processing unit 108 of the user system. The processing unit of the user system splits the OY-Packet into two or more portions. Each portion may contain two or more N-Packets.

The processing unit of the user system may mask the OY-Packet information by applying a masking function to each portion of the OY-Packet. For example, the processing unit of the user system may apply masking to one or more of the following: each of N-RNAC incorporated in the OY-Packet and/or to each Y-Packet incorporated in the OY-Packet and/or to each OY-Packet. The results of one or more masking may be stored in one or more of the storage units 110 of the user system. The results that are not stored are sent to the processing unit of the verification system.

The challenge generated by the N-packet generator that is sent to the display unit of the user system may incorporate multiple N-packets and each N-packet may incorporate three or more N-RANC. The user may select multiple Y-packets that form the OY-packet. The OY-packet may be split into 2 portions (i.e., an OYA-portion and an OYB-portion).

The processing unit of the verification system may apply hashing and/or encryption and then select two or more random synchronization elements of the synchronization system from a list stored in the one or more storage units of the verification system. The selected random synchronization elements form a sync registry. The processing unit of the verification system may add a secret to the OY-packet portions, individually or collectively, and may perform a multi-layer hashing and/or encryption function on the OY-packet portions, individually and/or collectively. The hashed and/or encrypted unique OY-packet portions may then be distributed among one or more synchronization elements, and be stored in one or more of the storage units in one or more of the synchronization elements to which the OY-packet portion is distributed. The result is that the unique OY-packet portions are stored in different synchronization elements. The distribution information portions may be stored in a sync registry of the synchronization elements.

Figure 4:
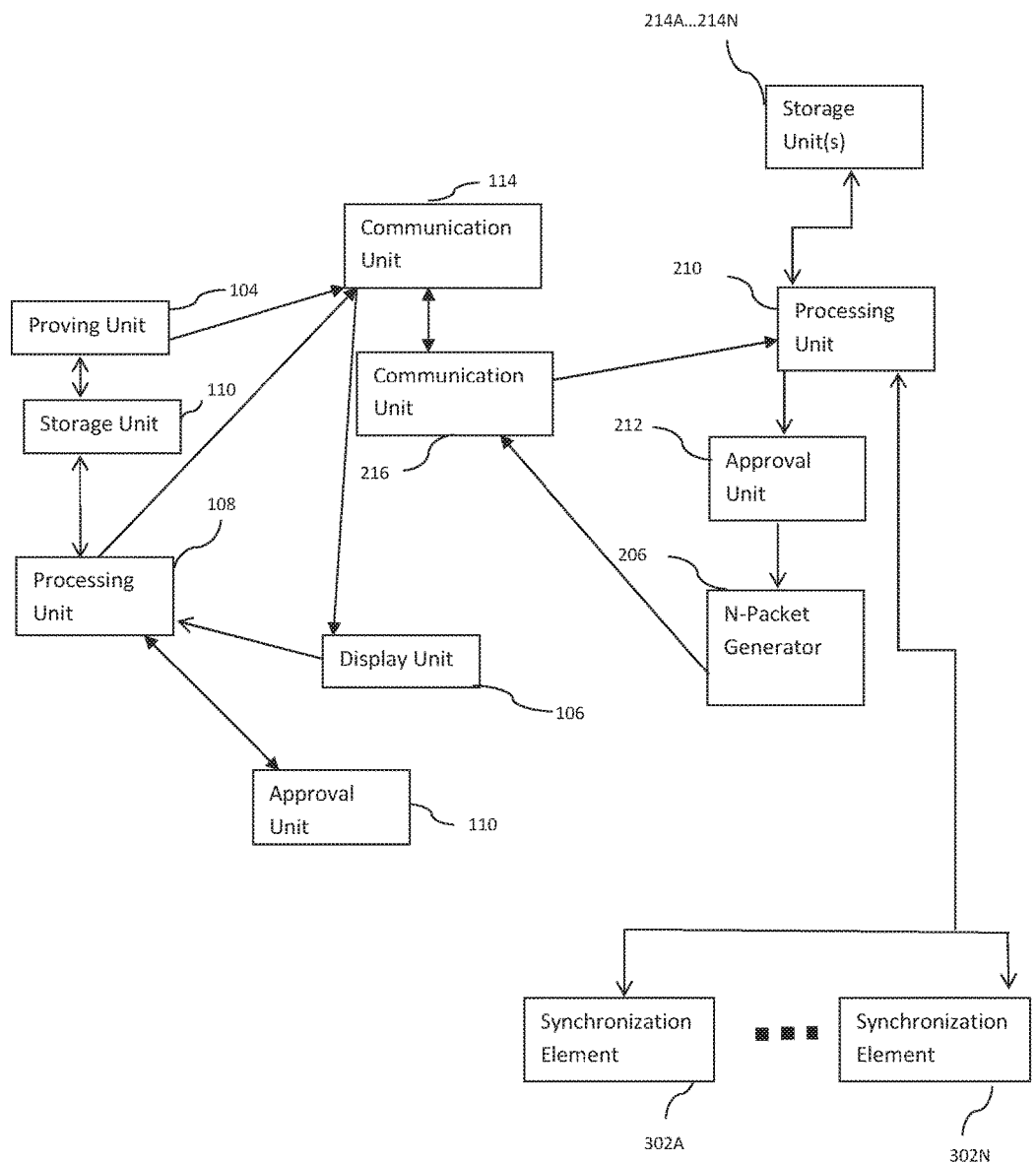
FIG. 4 is a system drawing showing a configuration of elements operable to undertake an access process of an embodiment of the present invention.

As shown in FIG. 4, the authentication system may be operable to perform an access process, whereby the registered user tries to authenticate itself through the operation of the verification system, in order for the user to gain access to secure portions of the client system. All communications between elements of the user system, elements of the verification system and elements of the synchronization system are via the communication units of the user system, the verification system and the synchronization elements of the synchronization elements of the synchronization system, as shown in FIG. 4. The proving unit 104 of the user system accesses one or more of the storage units 110 of the user system to retrieve proving information. The proving information may include a non-identifying identifier and a secret.

Some or all of the proving information that has been obtained by the proving unit is securely sent via the communication unit 114 of the user system to the processing unit 210 of the verification system, via the communication unit 216 of the verification system. The processing unit 210 retrieves information for the user from one or more of the storage units 214A . . . 214N of the verification system. The processing unit 210 combines information received from the client system with the information retrieved from one or more storage units of the verification system to create a package of information. The processing unit sends this package of information to the approval unit 212 of the verification system.

The approval unit 212 compares the values of the package of information it receives from the processing unit 210 with information stored in the verification system that was previously received from the client system. If the comparison is successful (i.e., the comparison results in a match between the compared information) the approval unit will accept the connection with the user system. If the comparison is not successful the approval unit will deny the connection with the user system. The results of the approval system are sent to the N-packet generator 206.

If the connection with the user system is not approved, the operation of the authentication system to attempt to register the user will end. If the connection with the user system is approved, the N-packet generator will generate a random challenge. The random challenge may include two or more packets (N-packets). Each N-packet contains two more random numbers or alphanumeric characters (N-RANC). A multi-layer hashing and/or encryption may be applied to the challenge sent to the display unit. The hashing and/or encryption is applied by the random number generator The N-packets are securely sent to the display unit 106 of the user system. Embodiments of the present invention may apply multi-layer hashing and/or encryption to provide security to the N-packets in transit between the N-packet generator and the display unit. For example, the multi-layer hashing and/or encryption may incorporate hashing and/or encrypting the N-RNAC and/or the N-packets prior to transit. The display unit 106 receives the N-packets and displays the corresponding information to the user. From corresponding information displayed the user selects two or more corresponding information and there by selecting N-packets, and N-RANC associated with the chosen N-packets. For ease of reference the N-packets chosen by the user are the Y-packets herein these Y packets are ordered and are called OY Packets.

In another embodiment of the present invention, the N-packet generator may be present in the user system and or other systems which may generate Y and/or OY packets by interaction with a user through any element from the user system or other systems, such as, cameras, scanners, etc.

The OY-Packets are sent by the display unit 106 to the processing unit 108 of the user system. The processing unit of the user system splits the OY-Packet into multiple portions. Each portion contains multiple N-Packets.

The processing unit 108 of the user system retrieves previously stored OY-packet portions from one or more storage units of the user system where such previously stored OY-packet portions are stored. The processing unit sends the previously stored OY-packet portions and more recently created OY-packet portions to the approval unit 110 of the user system. The approval unit of the user system compares the information it receives from the processing unit of the user system with the previously stored OY-packet portion and generates either an approval result or a denial result. The result generated by the approval unit of the user system (that is either an approval result or a denial result) is transferred to the processing unit of the user system. If the result from the approval unit of the user system is a denial result the authentication process is halted.

Figure 5:
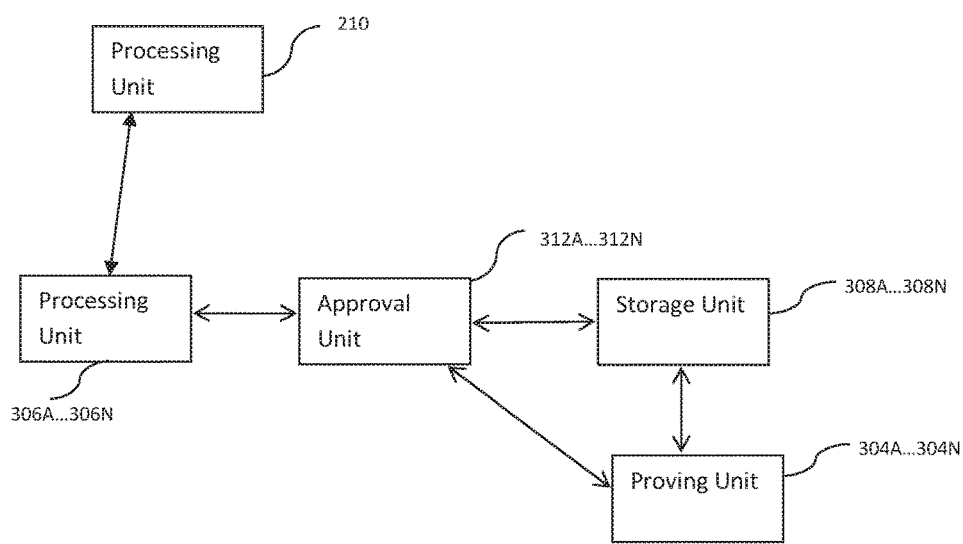
FIG. 5 is a system drawing showing a synchronization element operable to process a hashed OY-packet portion in accordance with an embodiment of the present invention.

If the result of the approval unit of the user system is an approval result, the processing unit of the user system may store one or more of the OY-packet portions recently generated in one or more storage units of the user system, and will send the rest of the OY-packet portions to the processing unit of the verification system. The processing unit of the verification system retrieves the synchronization system information for the user from the sync registry. The processing unit of the verification system may add a secret to the OY-packet portions it receives and perform a multi-layer hashing and/or encryption function on these OY-packet portions. After hashing and/or encryption the processing unit of the verification system may send the hashed and/or encrypted unique OY-packet portions to one or more of the processing units 302A . . . 320N of the synchronization elements of the synchronization system. Each processing unit of a synchronization element that receives a hashed and/or encrypted unique OY-packet portion from the processing unit 210 of the verification system. Each synchronization element of the synchronization unit that receives a hashed and/or encrypted OY-packet portion may undertake a process, as shown in FIG. 5. The processing unit 306A . . . 306N of the synchronization element may decode the hash and/or encryption to determine and identify one or more N-Packets and N-RANCs. The processing unit of the synchronization element may send the N-packets and N-RANCs to the approval unit 312A . . . 312N of the same synchronization element.

The proving unit 304A . . . 304N of the synchronization unit retrieves the previously stored hashed and/or encrypted OY-packet portions from the storage unit 308A . . . 308N of the synchronization element. The proving unit of the synchronization unit may decode the hash and/or encryption to determine and identify one or more N-packets and N-RANCs and these are sent to the approval unit of the synchronization element. The approval unit of the synchronization element compares the N-packets and N-RANCs it received that were recently generated to those that were previously stored. Based upon this comparison either a pass value or a fail value is generated. The generated pass value or fail value is transferred to the proving unit of the synchronization element.

The proving unit of the synchronization unit retrieves proving information from one or more of the storage units of the synchronization unit and both the proving information and the pass value or fail value that the proving unit has received may be hashed and/or encrypted and sent to the processing unit of the verification system.

Figure 6:
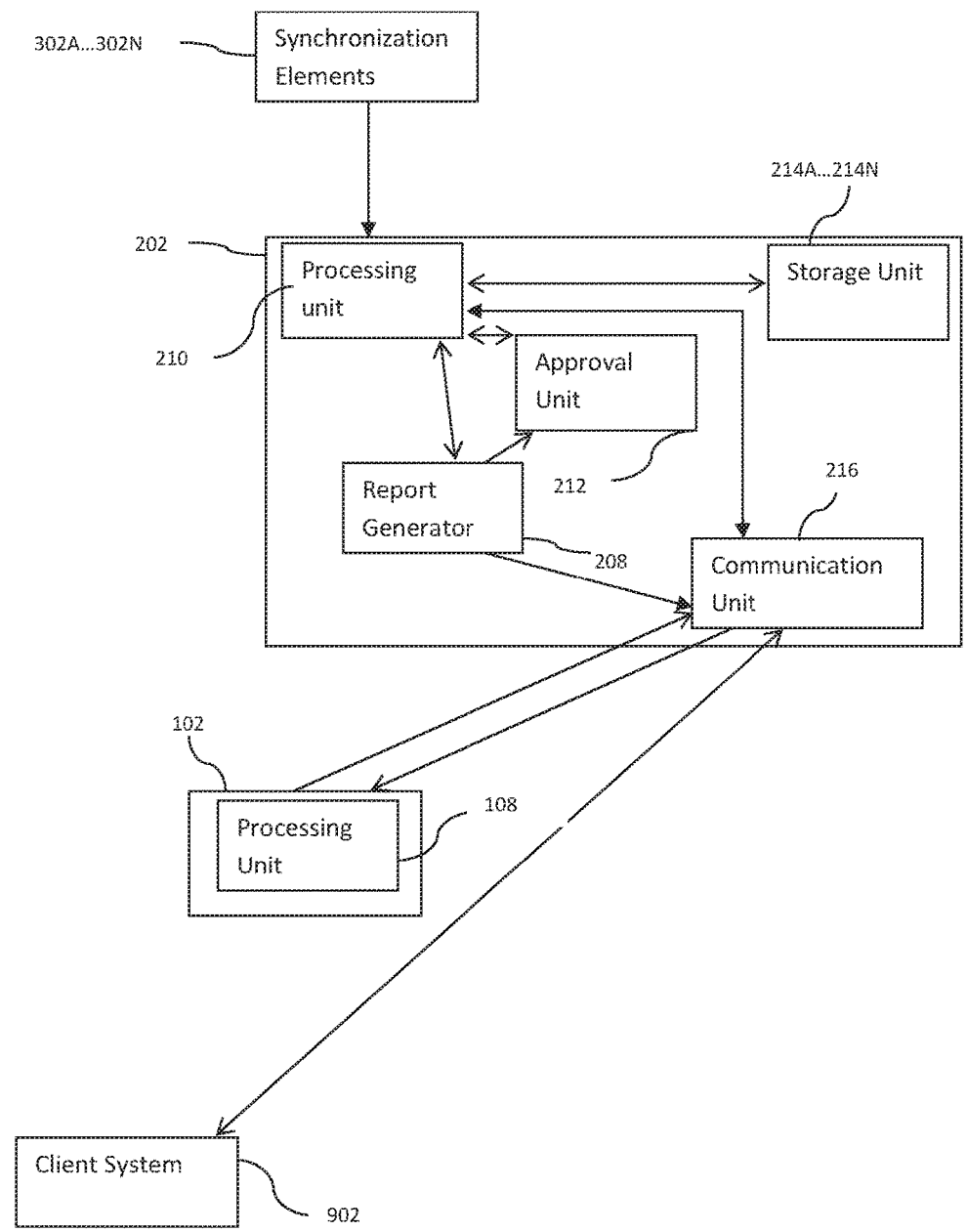
FIG. 6 is a system drawing showing a configuration of elements operable to undertake a decoding process of an embodiment of the present invention.

The processing unit of the verification system receives the hashed and/or encrypted results and proving information from each of the proving units of each of the synchronization elements that generated such information. For clarity, multiple synchronization elements may have received unique OY-packet portions and each such synchronization element will have processed the OY-packet portions in accordance with the method discussed herein. All communications between elements of the user system, verification system and the client system are via the communication units of the user system, client system and the verification system, as shown in FIG. 6. Also as shown in FIG. 6, the processing unit 210 of the verification system 202 will decode the proving information it received from each synchronization element 302A . . . 302N and send the decoded information to the approval unit 212 of the verification system. The processing unit 210 of the verification system retrieves proving information from one or more of the storage units 214A . . . 214N of the verification system. The processing unit of the verification system sends the retrieved proving information to the approval unit of the verification system. The approval unit of the verification system utilizes the information it receives to approve the synchronization elements.

The processing unit of the verification system decodes each of the pass and/or fail values it receives from the synchronization elements. The decoded values are saved in one or more of the storage units of the verification system as verification results. A verification results report may be generated by the processing unit of the verification system or a report generator 208, and this report may contain a variety of information, for example the total synchronization elements requested, the number of pass values received, the number of fail values received, synchronization system trust scores and other information.

The processing unit of the verification system may hash or encrypt the verification results and send the hashed and/or encrypted verification result to the processing unit 108 of the user system 102, via the communication unit 216 of the verification system. The processing unit of the user system sends the hashed or encrypted verification result to the client system 902. The client system submits a request for authentication to the processing unit 210 of the verification system, via the communication unit 216 of the verification system, based upon the verification results the client system receives. The processing unit of the verification system retrieves the verification results saved in one or more of the storage units of the verification system and sends the retrieved results to the approval unit of the verification system. The approval unit of the verification system reviews the retrieved results and may approve these and send the verification results to the client system which will then decide whether or not to authenticate the user based on the verification report results.

After a user is authenticated and is granted access to the secure portions of the client system, the user may access information (i.e., data, documents, transaction information, etc.) and/or provide user information (i.e., text, data, etc.) to the client system. As an example, the user may access the client system to send messages, to undertake purchases that involve credit card payments, to attach an e-signature to a document, or for a variety of other purposes. In the course of the interaction of the user with the client system, via the user system, user information will be transmitted between the client system and the user system. The present invention is operable to protect the security of such user and authentication related information during creation, transit, storage and authentication.

To achieve such security an embodiment of the present invention may incorporate a user system, a client system, a client display unit and a verification system. The user system may be incorporated wholly or partially in the client device utilized by the user to communicate with and access the client system. A skilled reader will recognize that embodiments of the present invention that achieve security for user and authentication related information in transit between the user device and the client system may incorporate other elements.

The user will use the user device to verify the user system and the user's credentials to the client systems. A user's credentials and the user system must be verified in order to verify that the user is authorized to access the secure portions of the client system. The user will only be able to perform certain functions or access certain information through the secure portions of the client system if the user is authenticated. As an example, the user will only be able to approve certain transactions through the client system if the user and the user system are authenticated. The client system is the system that the user is trying to gain access to and therefore requires the authentication to be performed. The verification system of the present invention will verify the identity of the user and the user system and cause the client system to recognize the user and the user system as authenticated, as is described herein.

Figure 7:
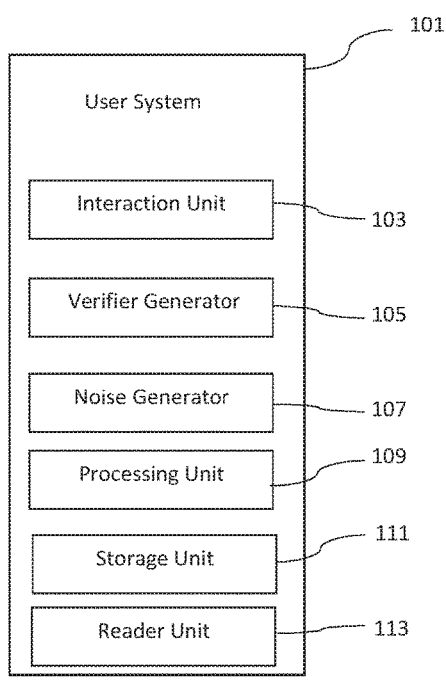
FIG. 7 is a system drawing showing elements of a user device of an embodiment of the present invention.

As shown in FIG. 7, a user system 101 utilized to transmit user information to and from the client system may incorporate multiple elements. For example, an embodiment of the present invention may include a user system that incorporates an interaction unit 103, a verifier generator 105, a noise generator 107, a processing unit 109, a storage unit 111, and a reader unit 113.

Figure 8:
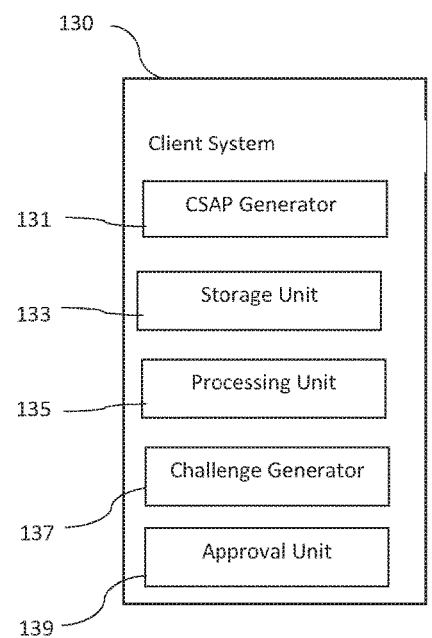
FIG. 8 is a system drawing showing elements of a client system of an embodiment of the present invention.

As shown in FIG. 8, the client system 130 of an embodiment of the present invention may incorporate multiple elements. For example, an embodiment of the present invention may include a client system that incorporates a CSAP generator 131, a storage unit 133, a processing unit 135, a challenge generator 137, and an approval unit 139.

Figure 9:
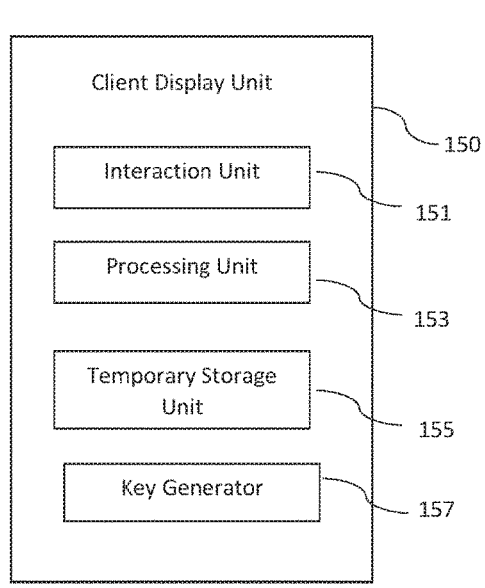
FIG. 9 is a system drawing showing elements of a client display unit of an embodiment of the present invention.

As shown in FIG. 9, the client display unit 150 of an embodiment of the present invention may incorporate multiple elements. For example, an embodiment of the present invention may include a client display unit that incorporates an interaction unit 151, a processing unit 153, a temporary storage unit 155 and a key generator 157.

Figure 10:
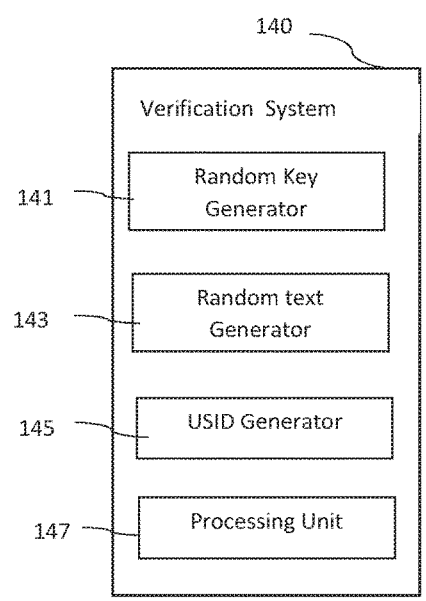
FIG. 10 is a system drawing showing elements of an verification system of an embodiment of the present invention.

As shown in FIG. 10, the verification system 140 of an embodiment of the present invention may incorporate multiple elements. For example, an embodiment of the present invention may include a verification system that incorporates a random key generator 141, a random text generator 143, a USID generator 145 and a processing unit 147.

Figure 11:
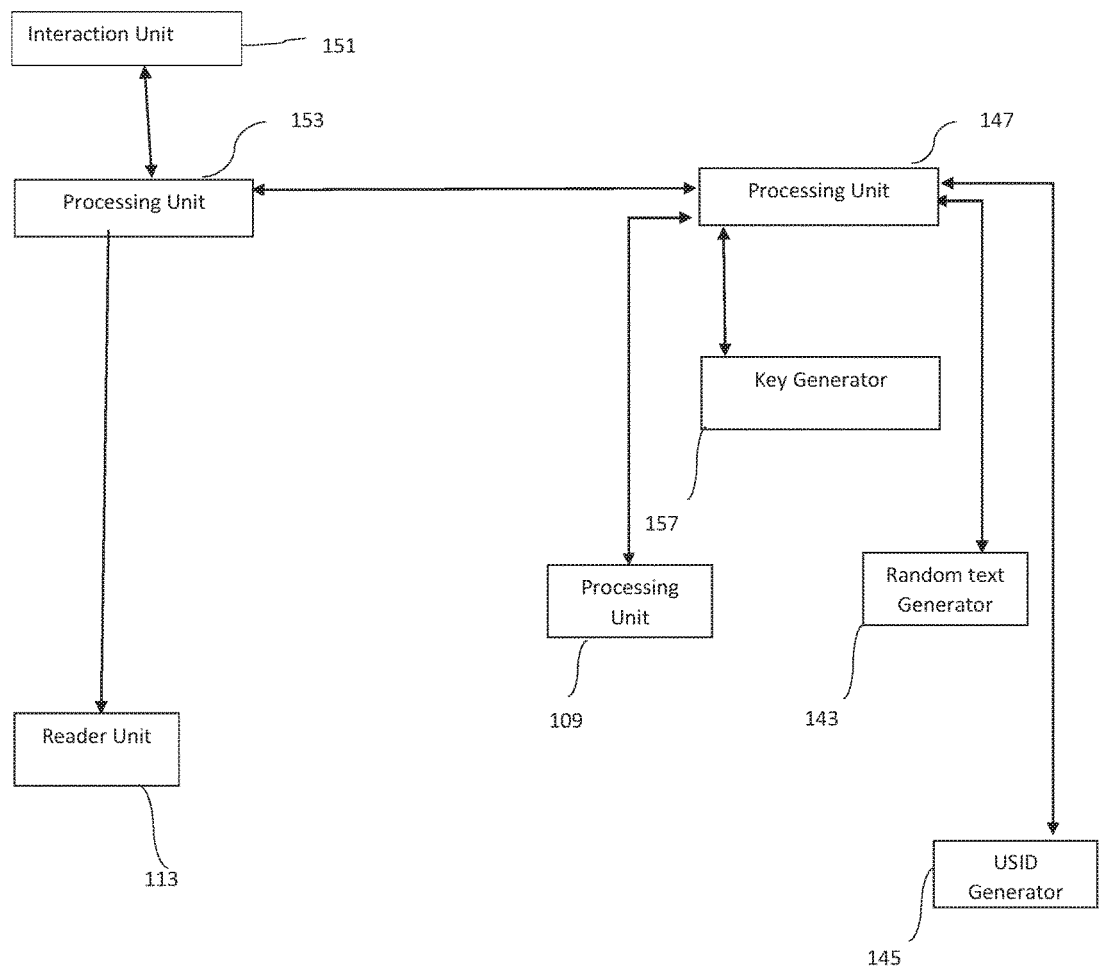
FIG. 11 is a system drawing showing a configuration of elements operable to undertake processing of a user authentication request to access the secure portion(s) of a client system in accordance with an embodiment of the present invention.

When the user wants to login to a secure portion of the client system, the user will declare his/her intention through interaction with client display unit, and use of the interaction unit of the client display unit to input a request. As shown in FIG. 11, the interaction unit 151 will communicate the request to the processing unit 153 of the client display unit, and the processing unit of the client display unit will then communicates the request to the processing unit 147 of the verification system. The processing unit 109 of the user system will generate a request to generate an Alpha Key ($\alpha k$) combo consisting of a $\alpha k1$ and $\alpha k2$ Keys that it sends to the key generator 157 of the client display unit via the processing unit 147 of the verification system. The key generator of the client display unit transmits both $\alpha k1$ & $\alpha k2$ to the processing unit 147 of the verification system.

The processing unit 147 of the verification system then requests random text from the random text generator 143 of the verification system, and requests a unique system & event identifier (USID) from the USID generator 145 of the verification system. The random text generator generates the random text and sends the random text to the processing unit 147 of the verification system. The USID generator generates the USID and sends the USID to the processing unit of the verification system. The USID generator is operable to identify to the verification system, the user device and event that is trying to connect to the secure area in the client system. The USID may be unique to each tab in a browser or in multiple browsers to identify and control the number of browsers or tabs that are open for use by a user.

The processing unit 147 of the verification system combines the USID and random text that it receives with αk2 into a data string and converts the data string into a machine readable format, then sends this to the processing unit 153 of the client display unit. The interaction unit 151 of the client display unit makes the information available to the reader unit 113 of the user system.

Figure 12:
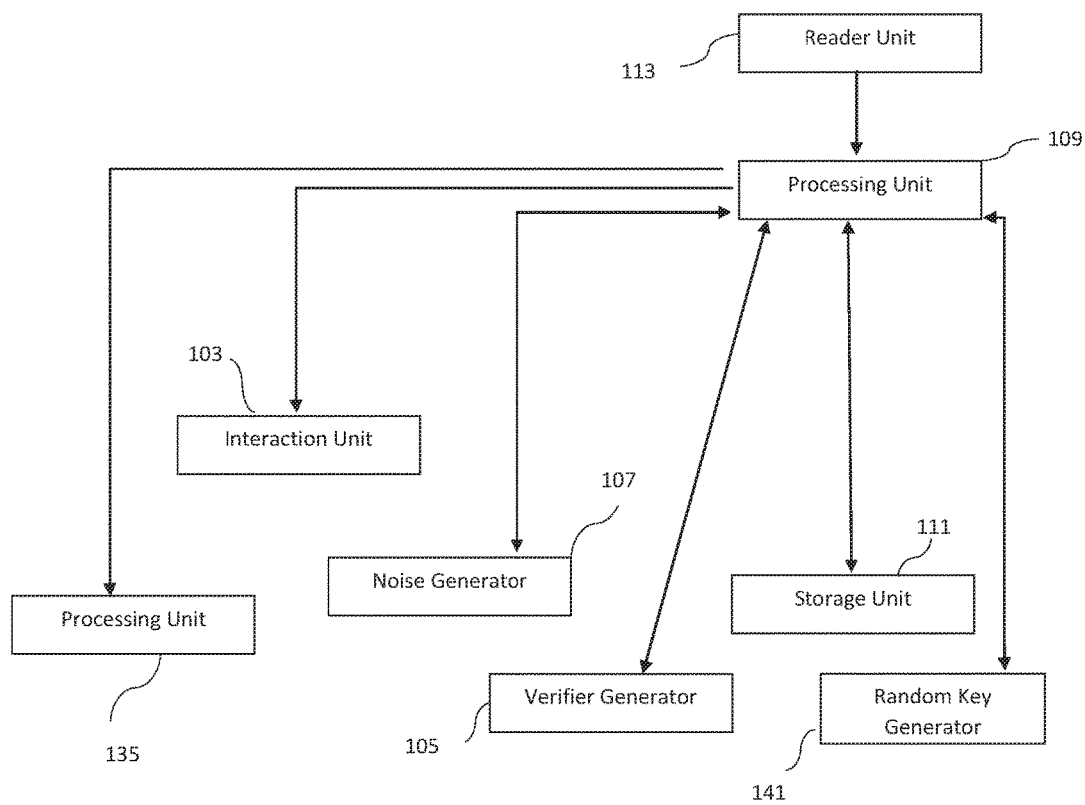
FIG. 12 is a system drawing showing a configuration of elements operable to undertake the generation and processing of noise and keys for authentication of a user in accordance with an embodiment of the present invention.

As shown in FIG. 12, after the process of FIG. 11 is completed the information is made available to the user system through the reader unit 113. The reader unit 113 may include one or more sensors including any of the following auditory, visual, tactile, print, movement and other kind of sensors that may be incorporated in the client device or external to the client device but connected thereto either via a wired connection or a wireless connection. The sensors may be utilized to obtain information relating to the user.

The reader unit 113 then sends the information that it obtained to the processing unit 109 of the user system. The processing unit of the user system may separate the information it receives from the reader unit and may hold that information. The processing unit 109 of the user system will request noise from the noise generator 107 of the user system. The noise generator will generate noise and will send the noise to the processing unit of the user system. The noise is used to mask the identity of the information in transit.

If the user has previously been authenticated by the client system, the user system may have a random Delta 1 Key (δk1).

The processing unit of the user system will send αk2 and δk1 to the verifier generator 105 of the user system. The processing unit will also send a request to the verifier generator of the user system requesting that a new Beta Key be generated. In response to this request the verifier generator will generate Beta Key 1 (βK1) and Beta Key 2 (βK2) using αk2 and δk1. The verifier generator 105 will send βK1 and βK2 to the processing unit 109 of the user system.

The processing unit of the user system will also access the storage unit 111 of the user system and request Delta 1 Key and/or session code and/or the generation of a session code. The storage unit 111 will provide Delta 1 Key to the processing unit of the user system or will generate a session code and provide this to the processing unit of the user system. For example, the processing unit 109 of the user system may request that the random key generator 141 of the verification system generate a random Delta 1 keys and/or a session code and provide this to the processing unit 109, that may generate a hash value for δk1 or SC that is provided.

The processing unit of the user system may generate a Manual Interaction Code (MIC) using the information obtained from each of the noise generator, the storage unit of the user system, and the verifier generator. The processing unit of the user system may send the MIC to the interaction unit 103 of the user system. The interaction unit 103 of the client display unit will display the MIC to the user.

When the MIC is generated residual data will exist (the "post-MIC data"). The processing unit of the user system may conduct a symmetric or asymmetric encryption on the post-MIC Data. The processing unit of the user system may send the post-MIC data and the hash value to the processing unit 135 of the client system.

Figure 13:
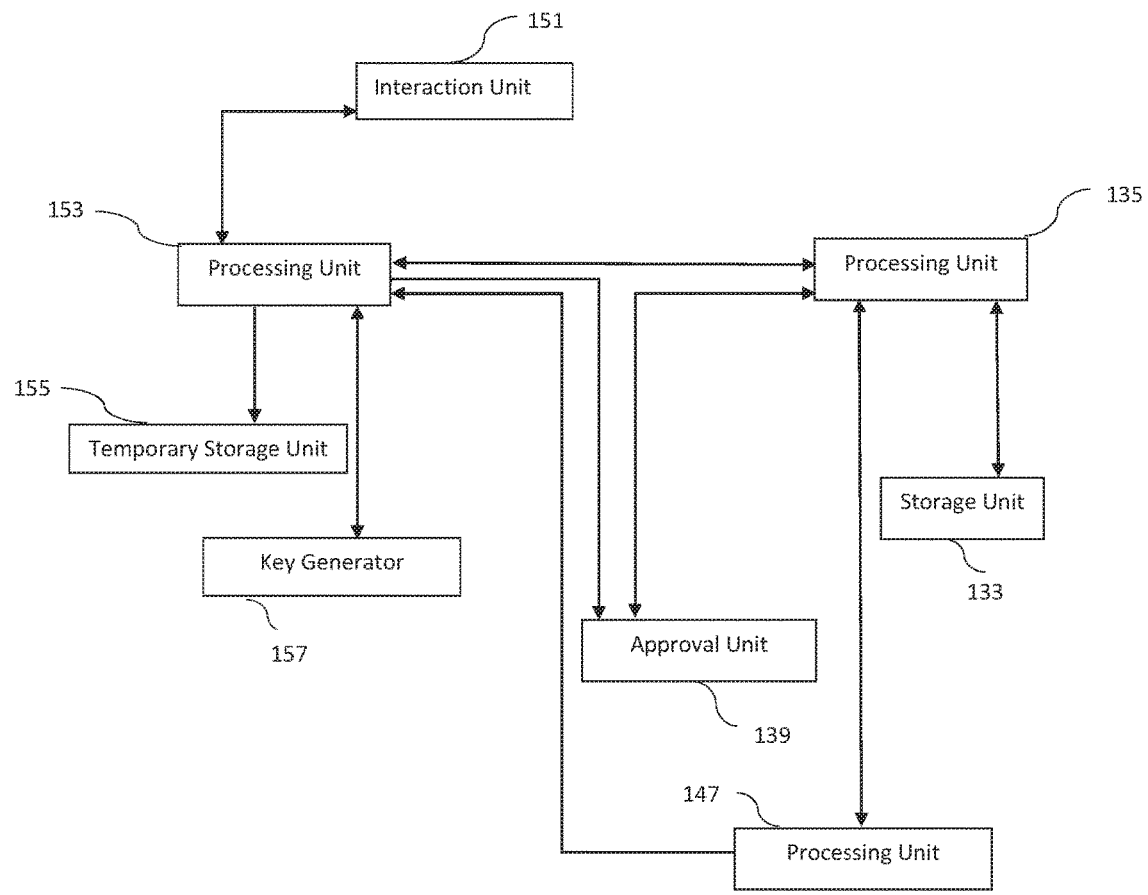
FIG. 13 is a system drawing showing a configuration of elements operable to undertake the verification of keys for authentication of a user in accordance with an embodiment of the present invention.

As shown in FIG. 13, once the MIC, the post-MIC data and the hash value are created by the user system, the processing unit 135 of the client system receives post-MIC data and the hash. The processing unit 135 of the client system sends the hash value to be stored temporarily in the storage unit 133 of the client system. The post-MIC data is sent to the processing unit 153 of the client display unit.

The processing unit 153 of the client display unit combines αk1 and post-MIC data as a package and sends this package to the key generator 157 of the client display unit. The processing unit 153 requests that the key generator 157 of the client display unit generates a Gamma key (γK). The γK is sent by the key generator of the client display unit to the processing unit 153 of the client display unit.

The user is now required to interact with the interaction unit 151 of the client display unit. The user must manually enter the MIC. Once entered, the MIC is then sent by the interaction unit of the client display unit to the processing unit 153 of the client display unit. The processing unit 153 uses γK, MIC and package, to cause SC or δk1 to be available. The processing unit of the client display unit calculates the hash value for SC or δk1 and sends the hash value to the approval unit 139 of the client system for verification.

Any of the information received or generated by the processing unit of the client display unit can be temporarily stored in the temporary storage unit 155 of the client display unit at any point during the processing activities of the processing unit 153 of the client display unit.

The processing unit 135 of the client system retrieves the hash value temporarily stored in the storage unit 133 of the client system. The processing unit of the client system sends either the hash value of SC or δk1, and the value retrieved from storage to the approval unit 139 of the client system. The approval unit 139 compares the hash values to determine a match.

If the hash values match then the approval unit 139 confirms the match to the processing unit 135 of the client system.

Figure 14:
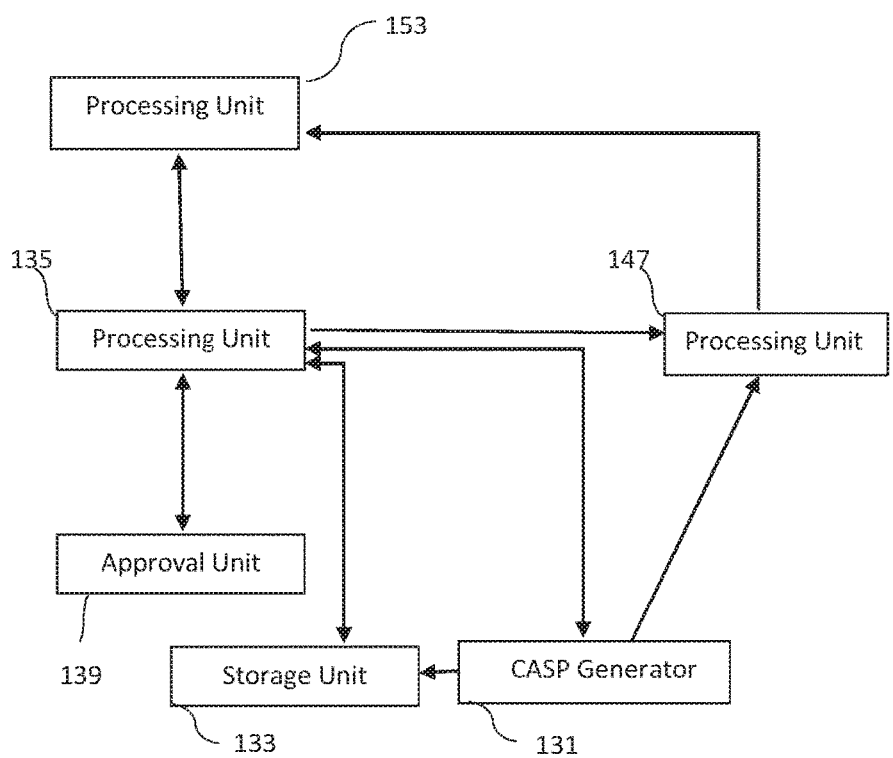
FIG. 14 is a system drawing showing a configuration of elements operable to undertake the verification of tokens for authentication of a user in accordance with an embodiment of the present invention.

As shown in FIG. 14, upon receiving this match confirmation, the processing unit 135 of the client system requests a Client Session Access Pass (CSAP) from the CSAP generator 131. The CSAP generator 131 generates the CSAP which is sent to the storage unit 133 of the client system to be stored temporarily. The CSAP generator 131 also sends the CSAP to the processing unit 147 of the verification system. The processing unit 147 of the verification system sends the CSAP to the processing unit of the 153 client display unit. The processing unit 153 of the client display unit sends CSAP to the processing unit 135 of the user system. The processing unit 135 of the user system sends CSAP to the approval unit 139 of the client system. The approval unit of the client system confirms the CSAP. The processing unit of the user system receives notice of such confirmation and operates to permit the user to access secured portions of the client system.

If the approval unit 139 of the client system determines that the values do not match, then the user, the user system and the client display unit are not authenticated.

The CSAP generator 131 of the client system may be utilized to test conditions relating to the authentication of the user; the user system and the client display unit periodically through the generation of CSAP, the processing thereof by the processing unit of the client system and the transfer of such CSAP to other processing units of the verification system, user system, client display unit and storage of such CSAP in the storage unit of the client system, user system and client display unit, in accordance with the method described herein. In any instance that the approval unit of the client system determines that authentication conditions are not met in relation to the CSAP, for example, such as a determination that the CSAP received by the processing unit of the client system and the stored CSAP do not match, then the authentication (i.e., CSAP authentication) of the user, the user device and the client display unit will be rescinded and access to the secure area terminated for the user, the user device and the client display unit.

CSAP conditions for authentication applied in embodiments of the present invention may include conditions relating to any of the following: dimensions, geo-temporal, machine learnt artificial intelligence, behavioral, or any other conditions.

Figure 15:
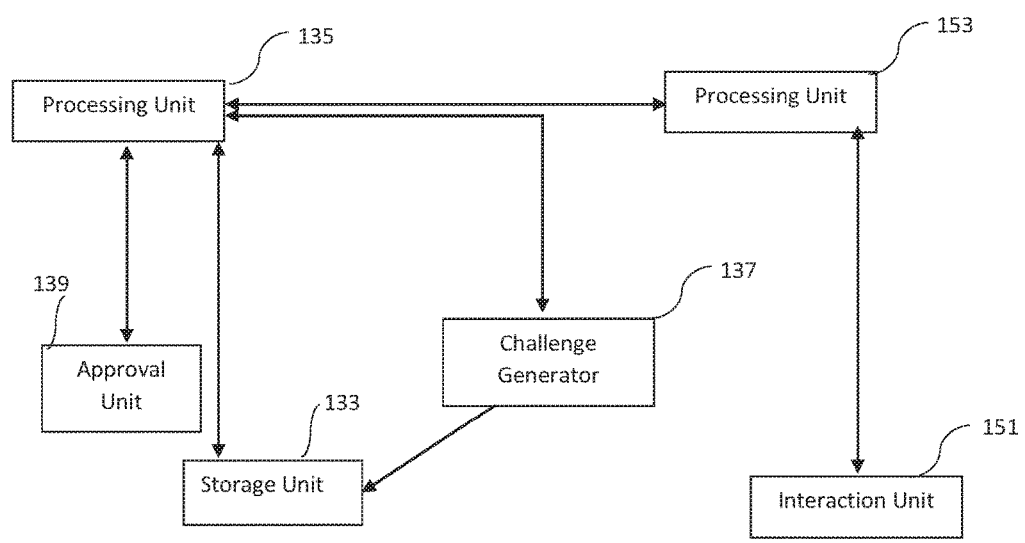
FIG. 15 is a system drawing showing a configuration of elements operable to undertake the verification of a challenge via a client display system for authentication of a user in accordance with an embodiment of the present invention.

Another embodiment of the present invention whereby the user uses the client display unit to attempt to validate a transaction through access to a secure portion of the client system is shown in FIG. 15. The processing unit 153 of the client display unit sends a request to the processing unit 135 of the client system to validate a transaction. Upon such a request the processing unit 135 of the client system sends a request to the challenge generator 137 of the client system to generate a challenge. Upon such a request the challenge generator 137 of the client system will generate a challenge and may further apply a hash value to the result of the challenge, and save the solution and/or the hash value in the storage unit 133 of the client system. The challenge generator of the client system will send the challenge to the processing unit 135 of the client system.

The processing unit 135 of the client system may apply symmetric and/or asymmetric encryption to the challenge. The processing unit 135 will send the challenge to the processing unit 153 of the client display unit. The processing unit 153 of the client display unit may decrypt the challenge using the key provided to it, and will send the challenge to the interaction unit 151 of the client display unit. In one embodiment of the present invention, the user may be required to interact with the interaction unit 151 of the client display unit to find the solution to the challenge. In another embodiment of the present invention, the processing unit 153 of the client display unit may solve the decrypted challenge.

Once the user using the client display unit finds a solution to the challenge, the user solution is sent to the processing unit 153 of the client display unit. The processing unit 153 of the client display unit may generate a hash value based upon the user solution, and the processing unit of the client display unit may further add either symmetric or asymmetric encryption to this hash value and/or to the solution. The results of the processing by the processing unit of the client display unit (e.g., a hash value or an encrypted hash value, or a solution or an encrypted solution) may be sent to the processing unit 135 of the client system. The processing unit 135 of the client system may send a request to the storage unit 133 of the client system to retrieve the stored solution and/or the stored hash value. Upon such a request the storage unit 133 of the client system will retrieve the stored solution and/or the stored hash value and send the stored solution and/or stored hash value to the processing unit 135 of the client system.

The processing unit 135 of the client system will decrypt any encrypted hash value or encrypted solution and/or non-encrypted hash values it receives from the processing unit 153 of the client display unit. The processing unit 135 of the client system will send the hash value and/or solution it receives from the processing unit 153 of the client display unit (in an unencrypted form), and the stored solution and/or the stored has value, to the approval unit 139 of the client system for approval. The approval unit 139 of the client system will compare the received solution to the stored solution, and/or the received hash value to the stored hash value.

If the received solution and/or hash values matches with the stored solution and/or the hash values, the approval unit 139 will send confirmation to the processing unit 135 of the client system of a match. If the match is a positive the processing unit 135 of the client system will transmit the confirmation of the positive match to the client system to confirm that the authentication of the transaction has completed successfully and the client system will thereby authorize the transaction.

If the received solution and/or hash values does not match with the stored solution and/or the hash values, the approval unit 139 will send notice to the processing unit 135 of the client system that there is no match. The processing unit of the client system will transmit the notice to the client system and advise the client system not to authenticate the transaction.

In another embodiment of the present invention, the processing unit of the verification system can perform the functions described for the processing unit of the client system in accordance with FIG. 14. In such an embodiment of the present invention a challenge generator unit and an approval unit may be incorporated in either the client system or the verification system, and such challenge generator unit and approval unit will have the same functions as described in accordance with FIG. 14 of the challenge generator 137 and the approval unit 139.

Figure 16:
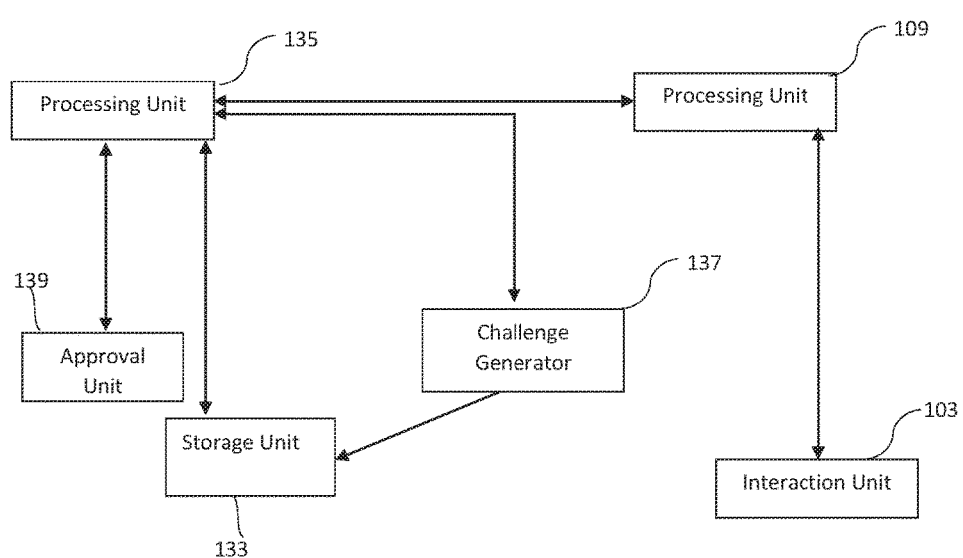
FIG. 16 is a system drawing showing a configuration of elements operable to undertake the verification of a challenge via a user device for authentication of a user in accordance with an embodiment of the present invention.

Another embodiment of the present invention whereby the user uses the user system to attempt to validate a transaction is shown in FIG. 16. In such an embodiment of the present invention the processing unit 109 of the user system sends a request of the processing unit 135 of the client system to validate a transaction. Upon such a request, the processing unit 135 of the client system sends a request to the challenge generator 137 to generate a challenge. Upon such a request the challenge generator 137 will generate a challenge, and will further apply hash value to the result of the challenge (the solution of the challenge), and save the solution and/or hash value in the storage unit 133 of the client system.

The processing unit 135 of the client system may apply symmetric and/or asymmetric encryption to the challenge. The processing unit 135 will send the challenge, which may be encrypted, to the processing unit 109 of the user system. The processing unit 109 of the user system may decrypt the challenge, if the challenge is encrypted, and will send the challenge to the interaction unit 103 of the user system. In one embodiment of the present invention, the user may be required to interact with the interaction unit 103 of the user system to find the solution to the challenge. In another embodiment of the present invention, the processing unit 109 of the user system may solve the decrypted challenge.

Once the user finds a solution to the challenge, the user solution is sent to the processing unit 109 of the user system. The processing unit 109 of the user system may generate a hash value based upon the user solution, and the processing unit 109 of the user system may further add either symmetric or asymmetric encryption to this hash value and/or to the solution. The results of the processing by the processing unit 109 of the user system (e.g., a hash value or an encrypted hash value, and a solution or an encrypted solution) may be sent to the processing unit 135 of the client system. The processing unit 135 of the client system may send a request to the storage unit 133 of the client system to retrieve the stored solution and/or the stored hash value. Upon such a request the storage unit 133 of the client system will retrieve the stored solution and/or the stored hash value and send the stored solution and/or stored hash value to the processing unit 135 of the client system.

The processing unit 135 of the client system will decrypt any encrypted hash value or encrypted solution it receives from the processing unit 109 of the user system. The processing unit 135 of the client system will send the hash value and solution it receives from the processing unit 109 of the user system (in an unencrypted form), and the stored solution and/or the stored has value, to the approval unit 139 of the client system for approval. The approval unit 139 of the client system will compare the received solution to the stored solution, and/or the received hash value to the stored hash value.

If the received solution matches with the stored solution and/or the received hash value matches with the stored hash value, then the approval unit 139 will send confirmation to the processing unit 135 of the client system of a match. The processing unit 135 of the client system will transmit the confirmation of a match to the client system to confirm that the authentication of the transaction is completed and successful.

If the received solution matches with the stored solution and/or the received hash value matches with the stored hash value, then the approval unit 139 will send notice to the processing unit of the client system that there is no match. The processing unit of the client system will transmit the notice to the client system and advise the client system not to authenticate the transaction.

In another embodiment of the present invention, the processing unit of the verification system can perform the functions described for the processing unit of the client system in accordance with FIG. 16. In such an embodiment of the present invention a challenge generator unit and an approval unit may be incorporated in either the client system or the verification system, and such challenge generator unit and approval unit will have the same functions as described in accordance with FIG. 16 of the challenge generator 137 and the approval unit 139.

A system and network for authentication may comprise one or more first peers, one or more servers, and one or more second peers, each comprising at least a processor and a transmitter/receiver. One or more first peers and one or more second peers may additionally comprise a respective memory. In some embodiments, each of one or more first peers and one or second peers may comprise a visual display. One or more servers may additionally comprise a database.

A transmitter/receiver of each of a first peer, a second peer, and a server may be configured to transmit and receive information from an exogenous source. In some embodiments, a first peer may be configured to transmit and receive information from a server, a server may be configured to transmit and receive information from both a first peer and a second peer, and a second peer may be configured to transmit and receive information from a server. A memory of a first peer and a second peer and a database of a server may be configured to store information and to allow information to be retrieved. A visual display may additionally comprise a means for a user to interact with a display, e.g. enter data, select characters, select objects, etc.

A processor of a first peer, a second peer, or a server may comprise a processing migrator, a data manipulator, a data converter, a processing generator, and a processing verifier. A processing migrator may be configured to migrate data from one component within a first peer, a second peer, or a server to another component within a first peer, a second peer, or a server. By way of example, and not limitation, a processing migrator may be configured to move data from a memory of a first peer to a processor of a first peer, or from a processor of a second peer to a transmitter/receiver of a second peer. A data manipulator may be configured to manipulate data, e.g. combine, separate, separate and recombine, reorder, etc. By way of example, and not limitation, a data manipulator of a first peer may be configured to separate a one or more strings of characters into a first portion and a second portion, or a data manipulator of a server may be configured to combine a first portion of data with a second portion of data to produce a single packet of data.

A data converter may be configured to convert a first string of characters into a second string of characters, wherein each of a first string of characters and a second string of characters may be different in any one or more of length, composition, or arrangement. In some embodiments, a data converter may be configured to apply hash algorithms to a first string of characters. In other embodiments, a data converter may be configured to apply encryption protocols to a first string of characters. In yet other embodiments, a data converter may be configured to apply decryption protocols to a first string of characters. In other embodiments still, a data converter may be configured to apply any combination of hash algorithms, encryption protocols, decryption protocols, or any other known method of data conversion to a first string of characters to produce a second string of characters.

A processing generator may be configured to produce data. In some embodiments, data may comprise a one or more strings of characters of any length and may comprise bar codes and the like. In some embodiments, data may be produced in either a random manner or in a directed manner. A processing verifier may be configured to compare two or more data and determine if those data are identical or different. In some embodiments, a processing verifier and a processing generator may be paired to determine if a first string of characters and a second string of characters are identical and generate a response based on the identity of a first and second string of characters.

An authentication method may comprise a registration method 1700 and a user log-in method 2000. In some embodiments, a registration method 1700 may comprise creating one or more keys, distributing one or more keys, storing one or more keys on a local database, and storing one or more keys on a server database. Illustrated in FIG. 17, a registration method 1700 may additionally comprise communication between a first peer 1701, a server 1750, and at least one second peer 1775.

In some embodiments of a registration method 1700, a server 1750 may receive a registration request 1702 from a first peer 1701. A server 1750 may send registration data 1751 to a first peer 1701. Registration data 1751 may comprise any data required for a registration method 1700. In some embodiments, registration data 1751 may comprise a client registration code 1703. A client registration code 1703 may be made up of one or more characters comprising letters, numbers, symbols, or any combination thereof, and may be generated by a server 1750. In other embodiments, registration data comprises user selection objects. In yet other embodiments, registration data may comprise a combination of one or more of client registration codes 1703, user selection objects, and any other data required for registration.

A registration method 1700 may further comprise generating a server key 1705 and a client key 1706 from user input 1704. In some embodiments, a server key 1705 and a client key 1706 are used to generate a registration key 1707. In other embodiments, a server key 1705, a client key 1706, and at least one client registration code 1703 are used to generate a registration key 1707. Other embodiments may comprise different combinations of client keys 1706, server keys 1705, and client registration codes 1703 being used to generate registration keys 1707. Some information, e.g. a client key 1706, a client registration code 1703, may be stored in the memory 1708 of a first peer 1701. Further, a registration method 1700 may comprise transferring information from a first peer 1701 to a server 1750. In some embodiments, a registration key 1707 and a server key 1705 are transferred to a server 1750.

A registration method 1700 may comprise receiving information from a first peer 1701 at a server 1750. In some embodiments, information received at a server 1750 may comprise a registration key 1707 and a server key 1705. A server 1750 may generate a recipient code 1752. Further, a server 1750 may generate a sender code 1754. Even further, a server 1750 may generate a distribution code 1756. A server key 1705, recipient code 1752, and sender code 1754 may be used to generate a distribution key 1753. In some embodiments, a distribution key 1753 may be generated from any one or more of server keys 1705, recipient codes 1752, or sender codes 1754, or any combination therein. Some information, e.g. a recipient code 1752, a distribution key 1753, may be stored in the database 1757 of a server 1750. A registration method 1700 may further comprise transferring information from a server 1750 to at least one second peer 1775. In some embodiments, a distribution key 1753 and a distribution code 1756 are transferred to at least one second peer 1775.

A registration method 1700 may further comprise storing one or more keys on a local database. Illustrated in FIG. 17, at least one second peer 1775 may receive information from a server 1750. In some embodiments, information may comprise a distribution key 1753 and a distribution code 1756. A second peer may generate a deposit code 1776. Further, a distribution key 1753 and a deposit code 1776 may be used to generate a deposit key 1777. In some embodiments, a deposit key 1777 may be generated using only a distribution key 1753, only a deposit code 1776, or any combination of distribution keys 1753 and deposit codes 1776. Some information, e.g. a distribution key 1753, a deposit key 1777, a distribution code 1756 may be stored in the memory 1758 of a second peer device 1775. A registration method 1700 may further comprise transferring information from a second peer 1775 to a server 1750. In some embodiments, a deposit key 1777 and a distribution code 1756 are transferred to a server 1750.

A registration method 1700 may comprise receiving information from a second peer 1775 and storing that information in a local database. In some embodiments, a server 1750 receives information from a second peer 1775. Information received may comprise a deposit key 1777, a distribution code 1756, and other information needed for storage of information by the server 1750 or for identification of the second peer 1775.

Figure 18:
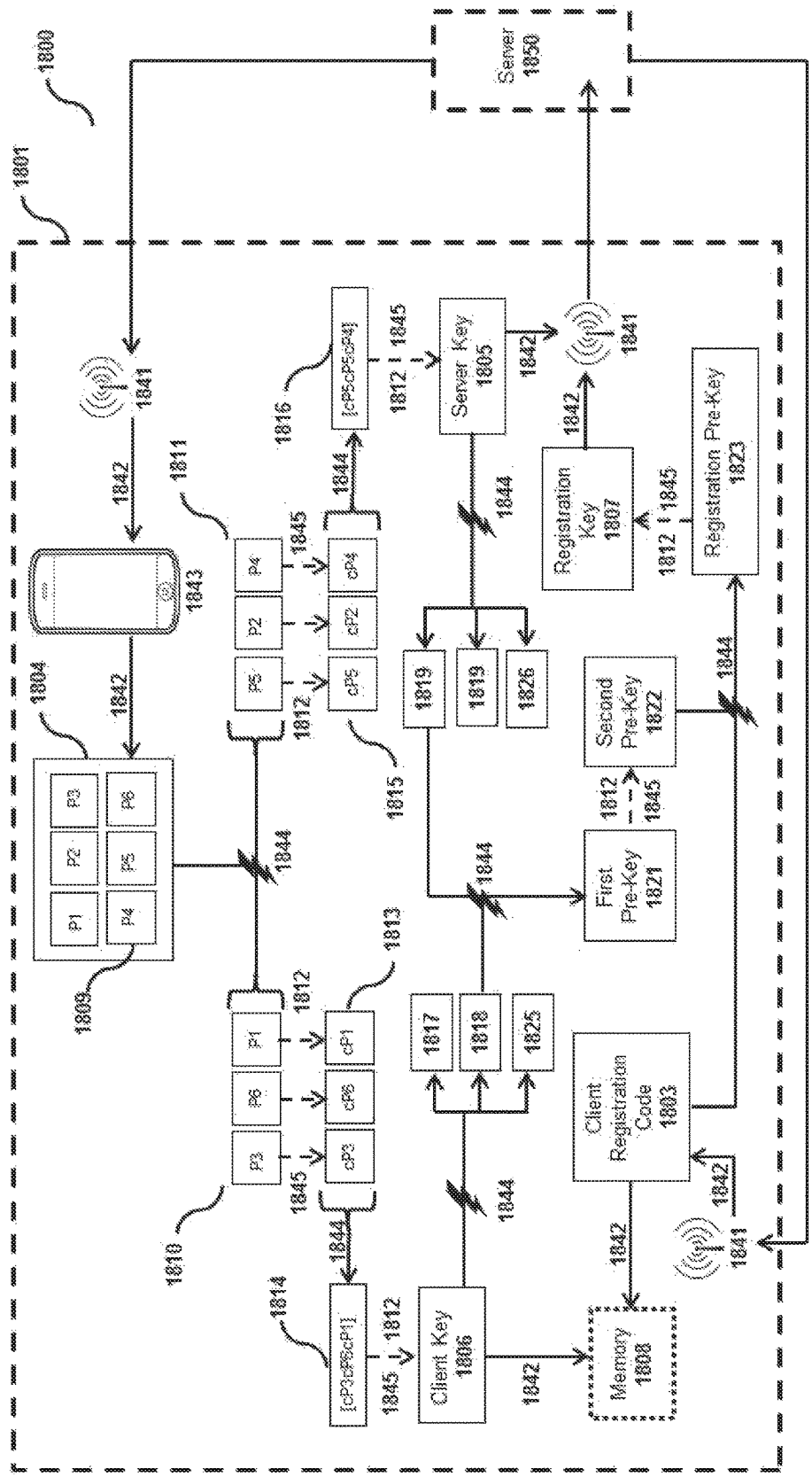
FIG. 18 illustrates a method of creating one or more keys, according to one embodiment of the present invention.

Referring now to FIG. 18, creating one or more keys 1800, according to some embodiments, may occur in a first peer 1801. A first peer 1801 may be any IoT device, i.e. any device that may connect to a network and have the ability to transmit data, including but not limited to cell phones, personal assistants, buttons, home security systems, appliances, and the like. A first peer 1801 may request registration from a server 1850. According to some embodiments, a server 1850 may transmit registration data to a first peer 1801. Registration data may be received by a transmitter/receiver 1841 of a first peer 1801 and may comprise any data necessary to generate one or more keys 1800 at a first peer 1801. In some embodiments, registration data may comprise a client registration code 1803. In other embodiments, registration data may comprise a client registration code 1803 and additional data which may serve as a precursor to user input 1804. A client registration code 1803 may comprise a one or more strings of characters of any length.

User input 1804 may comprise any form of user-generated data which comprises discreet units of information. In some embodiments, user input 1804 comprises biometric data, e.g. fingerprint, iris, etc. In those embodiments, biometric data may be split into discreet units of information comprising identifiers. Identifiers may be converted into unique selection codes 1809. In other embodiments, user input 1804 may comprise any number of spatial and/or temporal data. Spatial and/or temporal data may be split into discreet units of information comprising identifiers. Identifiers may be converted into unique selection codes 1809. In yet other embodiments, user input 1804 may comprise a combination of biometric data and spatial and/or temporal data, each of which may be used to generate unique selection codes 1809.

In other embodiments, user input 1804 may comprise one or more selection objects. One or more selection objects may be images, icons, tokens, buttons, or any other object that allows a user to select one or more selection objects from a group of selection objects. In some embodiments, selection objects may be received at a transmitter/receiver 1841 and a processing migrator 1842 may migrate selection objects to a visual display 1843. Upon selection by a user on a visual display 1843, selection objects may be converted into selection codes 1809 which may comprise any number of characters, e.g. letters, numbers, symbols. In a specific embodiment, selection objects are images that may be received from a server 1850. Each image is assigned a unique selection code 1809, wherein user selection of a combination of selection objects produces a user input 1804 comprising a combination of selection codes 1809 that is unique to the user's selection of selection objects. In some embodiments, any combination of biometric data, spatial and/or temporal data, and selection objects may comprise user input 1804.

According to some embodiments, a user may generate user input 1804 comprising two or more selection codes 1809, wherein the number of selection codes is equal to n. A data manipulator 1844 may be configured to separate selection codes into two or more groups. In some embodiments, a data manipulator 1844 may be configured to separate selection codes 1809 into a first group 1810 and a second group 1811, wherein a first group 1810 comprises between one and n−1 selection codes 1809 and a second group 1811 comprises between one and n−1 selection codes 1809. Each selection code 1809 in a first group 1810 and a second group 1811 may be individually converted 1812 into a one or more strings of characters, by a data converter 1845, resulting in a first group of converted selection codes 1813 and a second group of converted selection codes 1815. In some embodiments, conversion 1812 may comprise using hash algorithms. In other embodiments, conversion 1812 may comprise using encryption methods. Yet other embodiments may comprise conversion 1812 using a combination of hash algorithms and encryption methods. A first group of converted selection codes 1813 may be used to generate a client pre-key 1814. Individual converted selection codes comprising a first group of converted selection codes 1813 may be combined by a data manipulator 1844 to form one or more strings of characters comprising a client pre-key 1814. In some embodiments, individual converted selection codes are combined through concatenation of units. Concatenation may comprise using each of the individual converted selection codes as a unit or may comprise using pieces of each individual converted selection code as a unit. A client pre-key 1814 may be converted 1812 to a client key 1806 by a data converter 1845. In some embodiments, conversion 1812 may comprise using hash algorithms. In other embodiments, conversion 1812 may comprise using encryption methods. Yet other embodiments may comprise conversion 1812 using a combination of hash algorithms and encryption methods. A client key 1812 may be stored in a memory 1808 of a first peer 1801 by a processing migrator 1842.

A second group of converted selection codes 1815 may be used to generate a server pre-key 1816. Individual converted selection codes comprising a second group of converted selection codes 1815 may be combined by a data manipulator 1844 to form one or more strings of characters comprising a server pre-key 1816. In some embodiments, individual converted selection codes may be combined through concatenation of units. Concatenation may comprise using each of the individual converted selection codes as a unit or may comprise using pieces of each individual converted selection code as a unit. A server pre-key 1816 may be converted 1812 to a server key 1805 by a data converter 1845. In some embodiments, conversion 1812 may comprise using hash algorithms. In other embodiments, conversion 1812 may comprise using encryption methods. Yet other embodiments may comprise conversion 1812 using a combination of hash algorithms and encryption methods.

According to some embodiments, a registration key 1807 may be generated. Each of a client key 1806 and a server key 1805 may be separated by a data manipulator 1844 into a client key first part 1817, a client key second part 1818, a server key first part 1819, and a server key second part 1820. In some embodiments, a client key 1806 may be separated into three or more parts. Likewise, a server key 1805 may be separated into three or more parts. A client key first part 1817 and a client key second part 1818 may comprise different portions of the characters that comprise a client key 1806. In a specific embodiment, each of a client key first part 1817 and a client key second part 1818 may be one half of a client key 1806. A server key first part 1819 and a server key second part 1820 may comprise different portions of the characters that comprise a server key 1805. In a specific embodiment, each of a server key first part 1819 and a server key second part 1820 may be one half of a server key 1805. A client key first part 1817, a client key second part 1818, a server key first part 1819, and a server key second part 1820 may be combined by a data manipulator 1844 through concatenation of units to form one or more strings of characters comprising a first pre-key 1821. Concatenation by a data manipulator 1844 may comprise using each of a client key first part 1817, a client key second part 1818, a server key first part 1819, and a server key second part 1820 as a unit or may comprise using pieces of a client key first part 1817, a client key second part 1818, a server key first part 1819, and a server key second part 1820 as a unit. Further, concatenation may comprise using any combination of parts generated by separation of a client key 1806 or a server key 1805. A first pre-key 1821 may be converted 1812 by a data converter 1845 into a one or more strings of characters comprising a second pre-key 1822. In some embodiments, conversion 1812 may comprise using hash algorithms. In other embodiments, conversion 1812 may comprise using encryption methods. Yet other embodiments may comprise conversion 1812 using a combination of hash algorithms and encryption methods. A second pre-key 1822 may be used to generate a registration pre-key 1823. According to some embodiments, a second pre-key 1822 and a client registration code 1803 may be concatenated by a data manipulator 1844 to form one or more strings of characters comprising a registration pre-key 1823. Concatenation may comprise using each of a second pre-key 1822 and a client registration code 1803 as a unit or may comprise using pieces of a second pre-key 1822 and a client registration code 1803 as a unit. A registration pre-key 1823 may be converted 1812 by a data converter 1845 into a one or more strings of characters comprising a registration key 1807. In some embodiments, conversion 1812 may comprise using hash algorithms. In other embodiments, conversion 1812 may comprise using encryption methods. Yet other embodiments may comprise conversion 1812 using a combination of hash algorithms and encryption methods.

A first peer 1801 may transmit information to a server 1850. According to some embodiments, a processing migrator 1842 of a first peer 1801 may migrate a registration key 1807 and a server key 1805 to a transmitter/receiver 1841 of a first peer 1801, which may transmit a registration key 1807 and a server key 1805 to a server 1850. In other embodiments, a transmitter/receiver 1841 of a first peer 1801 may transmit a registration key 1807, a server key 1805, and other information necessary for a registration method to a server 1850.

A registration method may further comprise distributing one or more keys 1900. Illustrated in FIG. 19, a transmitter/receiver 1941 of a server 1950 may receive information from a first peer 1901. According to some embodiments, a transmitter/receiver 1941 of a server 1950 may receive a registration key 1907 from a first peer 1901. A transmitter/receiver 1941 of a server 1950 may receive a server key 1905 from a first peer 1901. A transmitter/receiver 1941 of a server 1950 may receive both a registration key 1907 and a server key 1905 from a first peer 1901. A processing migrator 1942 may migrate a registration key 1907 and a server key 1905 to a processor of a server 1950. A registration key 1907 may be stored in a database 1957 of a server 1950 by a processing migrator 1942. A processing generator 1946 of a server 1950 may generate a peer list 1958. A peer list 1958 may comprise a list of peer devices, e.g. a first peer 1901, a second peer 1975, on the network. A peer list may also comprise recipient codes 1952 and distribution codes 1956, which may comprise a one or more strings of characters of any length. Additionally, a processing generator 1946 of a server 1950 may generate a sender code 1954, which may also comprise a one or more strings of characters of any length.

According to some embodiments, a server 1950 may receive a registration key 1907 from a first peer 1901. A registration key 1907 may be used to generate any number of registration key subparts. A data manipulator may generate registration key subparts from a registration key 1907. In these embodiments, a registration key 1907 may comprise any number of characters equal to n. Each registration key subpart may comprise any number or combination of characters equal to n−1. A server 1950 may generate one or more random strings of characters. Each of a registration subpart may be concatenated with one or more random strings of characters by a data manipulator 1944. In some embodiments, concatenated strings may be converted 1912. Each generated concatenated string or converted concatenated string may be transmitted to one or more second peers 1975.

A server 1950 may receive a server key 1908 from a first peer 1901. A server key 1908 may be used to generate any number of server key subparts. A data manipulator may generate server key subparts from a server key 1908. In these embodiments, server key 1908 may comprise any number of characters equal to n. Each server key subpart may comprise any number or combination of characters equal to n–1. A server 1950 may generate one or more random strings of characters. Each of a server key subpart may be concatenated with one or more random strings of characters by a data manipulator 1944. In some embodiments, concatenated strings may be converted 1912. Each generated concatenated string or converted concatenated string may be transmitted to one or more second peers 1975.

A data manipulator 1944 of a server 1950 may generate a distribution pre-key 1959 by combining any combination of a server key 1905, a recipient code 1952, a sender code 1954, a distribution code 1956, or a registration key 1907. In some embodiments, a distribution pre-key is comprised of a server key 1905, a sender code 1954, and a recipient code 1952, which may be combined through concatenation of units to form one or more strings of characters. Concatenation may comprise using each of a server key 1905, a sender code 1954, and a recipient code 1952 as a unit or may comprise using pieces of a server key 1905, a sender code 1954, and a recipient code 1952 as a unit. A distribution pre-key 1959 may be converted 1912 by a data converter 1945 into a one or more strings of characters comprising a distribution key 1953. In some embodiments, conversion 1912 may comprise using hash algorithms. In other embodiments, conversion 1912 may comprise using encryption methods. Yet other embodiments may comprise conversion 1912 using a combination of hash algorithms and encryption methods. A distribution key 1953 may be stored in a database 1957 of a server 1950 by a processing migrator 1942. A server 1950 may be configured to transmit information to a second peer 1975. In some embodiments, a processing migrator 1942 of a server 1950 may migrate a distribution key 1953 and a distribution code 1956 to a transmitter/receiver 1941 of a server 1950. In other embodiments, a transmitter/receiver 1941 of a server 1950 may transmit a distribution key 1953, a distribution code 1956, and other information necessary for a registration method to a second peer 1975. In some embodiments, a server 1950 may store any combination of a registration key 1907, a server key 1905, and a distribution key 1953 at a database 1957 of a server 1950.

A server 1950 may generate more than one distribution keys 1953 and transmit data to more than one second peer 1975. In some embodiments, a peer list 1958 may comprise a list of more than one second peers 1975 on the network. A second peer may comprise any IoT device, server, or any device that is on a network and capable of transmitting and receiving data from a server 1950. A server 1950 may generate a unique distribution code 1956 for each second peer 1975. A server 1950 may generate a unique recipient code 1952 for each second peer 1975. In these embodiments, a distribution key 1953 created for each second peer 1975 may be different from distribution keys 1953 created for other second peers 1975, although underlying server keys 1905 received from a first peer 1901 may be identical.

According to some embodiments, a registration key 1907 may be used to generate a distribution pre-key 1959. In these embodiments, any combination of a registration key 1907, a sender code 1954, a recipient code 1952, and a server key 1905 may be used to generate a distribution pre-key 1959.

Figure 17:
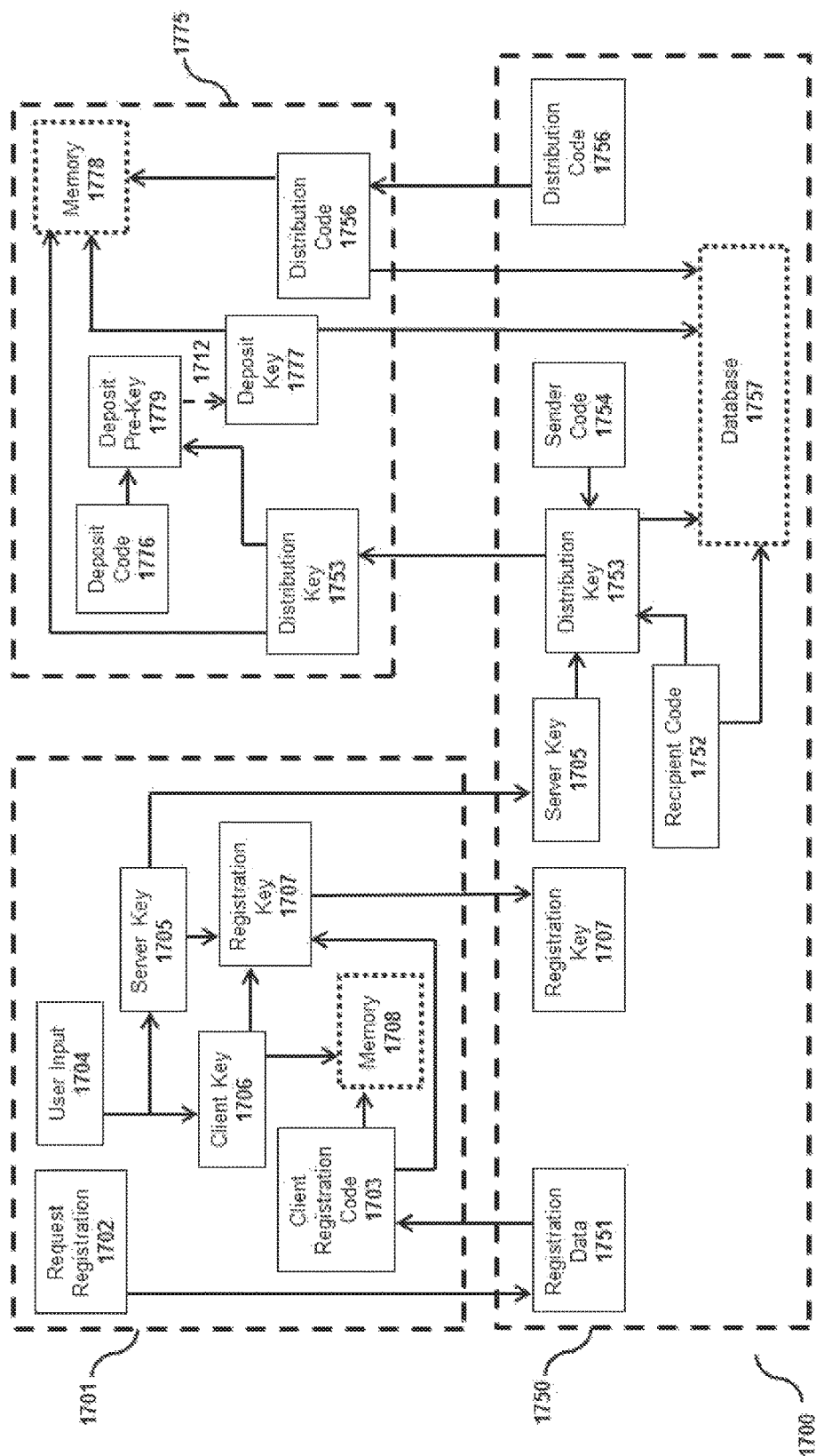
FIG. 17 illustrates a registration method, according to one embodiment of the present invention.

Referring now back to FIG. 17, a registration method 1700 may comprise storing one or more keys on a local database. According to some embodiments, a second peer 1775 may be configured to receive and transmit information to a server 1750 through a transmitter/receiver of a second peer 1775. A second peer 1775 may receive a distribution key 1753 from a server 1750 through a transmitter/receiver of a second peer 1775. A second peer 1775 may receive a distribution code 1756 from a server 1750. In some embodiments, a second peer 1775 may receive a distribution key 1753 and a distribution code 1756 from a server 1750. A distribution key 1753 and a distribution code 1756 may be stored in a memory 1778 of a second peer 1775. A second peer 1775 may generate a deposit code 1776. A deposit code 1776 may be a one or more strings of characters of any length and may be generated in a random fashion. Alternatively, a deposit code 1776 may be generated by a server 1750 and received by a second peer 1775. A deposit code 1776 and a distribution key 1753 may be combined through concatenation of units to form one or more strings of characters comprising a deposit pre-key 1779. Concatenation may comprise using each of a deposit code 1776 and a distribution key 1753 as a unit or may comprise using pieces of deposit code 1776 and a distribution key 1753 as a unit. A deposit pre-key 1779 may be converted 1712 into a one or more strings of characters comprising a deposit key 1777. In some embodiments, conversion 1712 may comprise using hash algorithms. In other embodiments, conversion 1712 may comprise using encryption methods. Yet other embodiments may comprise conversion 1712 using a combination of hash algorithms and encryption methods. A deposit key 1777 may be stored in a memory 1778 of a second peer 1775. In some embodiments, a second peer 1775 may transmit a deposit key 1777 and a distribution code 1756 to a server 1750. In other embodiments, a second peer 1775 may transmit a deposit key 1777, a distribution code 1756, and any other information necessary for a registration method 1700 to a server 1750.

A registration method 1700 may further comprise storing one or more keys on a server database. Shown in FIG. 19, a transmitter/receiver 1941 of a server 1950 may receive information from a second peer 1975. In some embodiments, a transmitter/receiver 1941 of a server 1950 may receive a distribution code 1956. In some embodiments, a transmitter/receiver 1941 of a server 1950 may receive a deposit key 1977. In other embodiments, a transmitter/receiver 1941 of a server 1950 may receive a distribution code 1956 and a deposit key 1977. In yet other embodiments, a transmitter/receiver 1941 of a server 1950 may receive a distribution code 1956, a deposit key 1977, and any other information necessary for a registration method. A distribution code 1956 and a deposit key 1977 may be stored in a database 1957 of a server 1950 by a processing migrator 1942.

In a specific embodiment, a registration method 1700 may comprise creating one or more keys, distributing one or more keys, storing one or more keys on a local database, and storing one or more keys on a server database. Illustrated in FIG. 17, a registration method 1700 may begin with a request for registration 1702 from a first peer 1701. A request for registration 1702 may be transmitted to and received by one or more servers 1750. One or more servers may transmit registration data 1751 to a first peer 1701. Referring now to FIG. 18, a specific embodiment may comprise a first peer 1801 receiving registration data from a server 1850. Registration data may comprise a client registration code 1803 and one or more selection objects. A client registration code 1803 may comprise a single, eight-digit string of characters. Selection objects may comprise a number of images. In a specific embodiment, selection objects may comprise a number of selection objects equal to 60. Each selection object may contain a unique selection code 1809. A selection code 1809 may comprise a one or more strings of characters, and in a specific embodiment, each selection code may comprise a string of five characters. A user may select a number of selection objects from selection objects received by a server 1850. In a specific embodiment, a user may select six selection objects. A user's selection of selection objects may generate user input 1804 comprising a collection of selection codes 1809 that may be chosen by selecting specific selection object associated with each selection code 1809. In a specific embodiment, user input 1804 comprises six, five-character selection codes 1809.

User input 1804 may be separated into a first group 1810 and a second group 1811. In a specific embodiment, each of a first group 1810 and a second group 1811 comprises three different selection codes 1809. Each selection code 1809 comprising a first group 1810 and a second group 1811 may be converted 1812 into one or more strings of characters. In a specific embodiment, each selection code 1809 may be converted using a hash algorithm and may collectively comprise a first group of converted selection codes 1813 and a second group of converted selection codes 1815, respectively. Each of a first group of converted selection codes 1813 and a second group of converted selection codes 1815 may be combined to generate each of a client pre-key 1814 and a server pre-key 1816, respectively. In a specific embodiment, three converted selection codes comprising a first group of converted selection codes 1813 may be concatenated to produce one or more strings of characters comprising a client pre-key 1814. Likewise, three converted selection codes comprising a second group of converted selection codes 1815 may be concatenated to produce one or more strings of characters comprising a server pre-key 1816. A client pre-key 1814 and a server pre-key 1816 may be converted 1812 to a client key 1806 and a server key 1805, respectively. In a specific embodiment, conversion 1812 comprises using a hash algorithm.

A registration key 1807 may be generated using a combination of client key 1806, server key 1805, and client registration code 1803. In a specific embodiment, a client key 1806 and server key 1805 are separated into a first part 1817 and 1819, and a second part 1818 and 1820, respectively. A first pre-key 1821 may be generated by combining any part of a client key 1806 and any part of a server key 1805 by concatenation to form one or more strings of characters. A first pre-key 1821 may be converted 1812 into one or more strings of characters comprising a second pre-key 1822. In a specific embodiment, conversion 1812 comprises using a hash algorithm. A registration pre-key 1823 may be generated by combining a client registration code 1803 and a second pre-key 1822 by concatenation to form one or more strings of characters. A registration pre-key 1823 may be converted 1812 to a registration key 1807, where conversion 1812 comprises using a hash algorithm. In a specific embodiment, a client key 1806 and a client registration code 1803 may be stored in a memory 1808 of a first peer 1801. Further, a server key 1805 and a registration key 1807 may be transmitted to one or more servers 1850.

A registration method may comprise distributing one or more keys. In a specific embodiment, shown in FIG. 19, a server 1950 may receive a registration key 1907 and a server key 1905 from a first peer 1901. A registration key may be stored in a database 1957 of a server 1950. A server 1950 may generate a peer list 1958, which may comprise a list of second peers 1975 on the network. For each of the second peers 1975, a server 1950 may generate a recipient code 1952 and a distribution code 1956. In a specific embodiment, a recipient code 1952 and a distribution code 1956 may be unique to both a specific second peer 1975 and a specific transaction. Additionally, a server 1950 may generate a sender code 1954 that may be unique to a particular server 1950. In a specific embodiment, a recipient code 1952, a sender code 1954, and a server key 1905 may be combined through concatenation to produce one or more strings of characters comprising a distribution pre-key 1959. A distribution pre-key 1959 may be converted 1912 into a distribution key 1953. In a specific embodiment, conversion 1912 may comprise using a hash algorithm. In some embodiments, multiple unique distribution keys 1953 may be generated, each comprising a different recipient code 1952 and having a different associated distribution code 1956 from a peer list 1958, wherein each unique distribution key 1953 may be ultimately transmitted to a different second peer 1975. In a specific embodiment, multiple unique distribution keys 1953 are generated from an identical server key 1905 and each of the unique distribution keys 1953 is transmitted to a separate second peer 1975 on a network.

A registration method may further comprise storing one or more keys on a local database, illustrated in FIG. 17. In a specific embodiment, a second peer 1775 may receive a distribution key 1753 and a distribution code 1756 from a server 1750. In this embodiment, a second peer 1775 may be one of several second peers 1775 in a network to receive distribution keys 1753 and distribution codes 1756 arising from a same transaction between a first peer 1701 and a server 1750 discussed above. A second peer 1775 may store a distribution key 1753 and a distribution code 1756 in a memory 1778 of a second peer 1775. Further, a second peer 1775 may generate a deposit code 1776. In a specific embodiment, a deposit code 1776 comprises a single string of eight characters. A deposit code 1776 and a distribution key 1753 may be combined through concatenation to produce one or more strings of characters comprising a deposit pre-key 1779. A deposit pre-key 1779 may be converted 1712 to a deposit key 1777. In a specific embodiment, conversion 1712 comprises using a hash algorithm. A second peer 1775 may transmit information to one or more servers 1750. In a specific embodiment, several second peers 1775 may transmit information to a server 1750. Information may comprise a distribution code 1756, a deposit key 1777, and any other information necessary to perform a registration process 1700.

Figure 19:
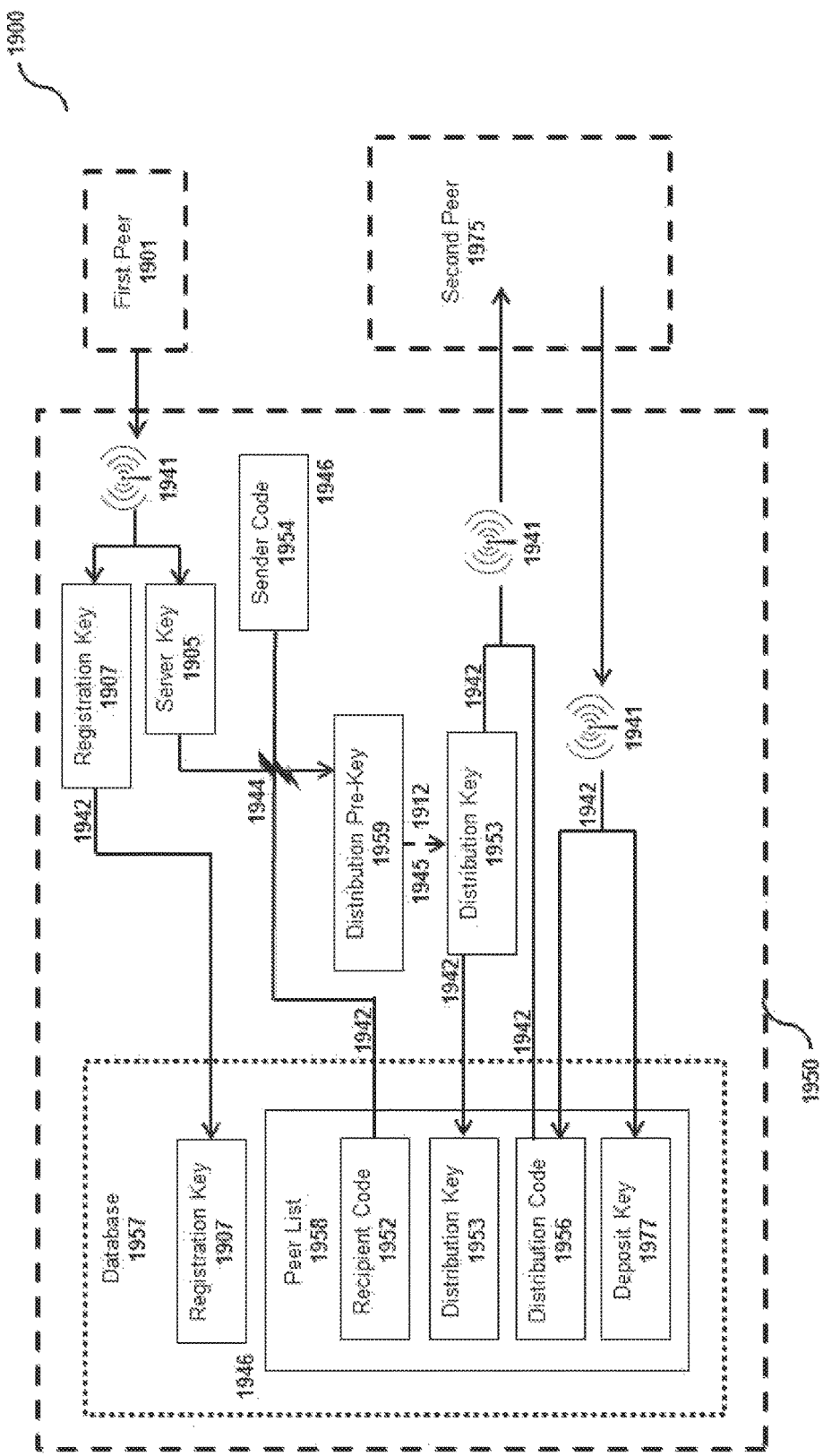
FIG. 19 illustrates a method of distributing one or more keys, according to one embodiment of the present invention.

A registration method 1700 may comprise storing one or more keys on a server database. In some embodiments, a server 1750 may be configured to receive information from one or more second peers 1775. In a specific embodiment, a server 1750 may receive information from several second peers 1775, information comprising distribution codes 1756 and deposit keys 1777. A server 1750 may store distribution codes 1756 and deposit keys 1777 in a database 1757. Referring now to FIG. 19, distribution codes 1956 and deposit keys 1977 may be stored on a peer list 1958 stored inside a database 1957. In a specific embodiment, distribution codes 1956 and deposit keys 1977 are paired with stored distribution keys 1953 and recipient codes 1952 which may be specific to a transaction conducted between a first peer 1901, a server 1950, and a specific second peer 1975.

Figure 20:
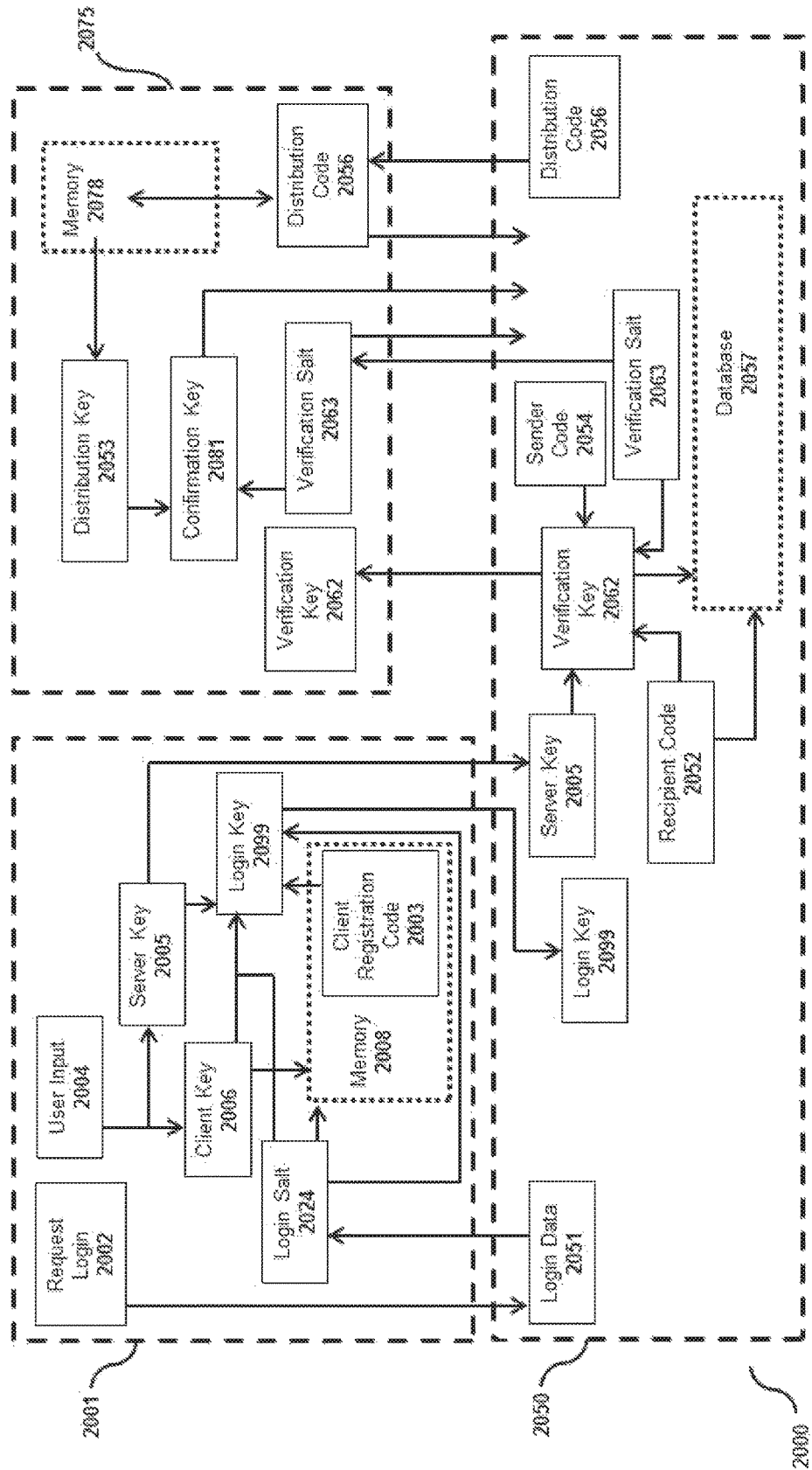
FIG. 20 illustrates a login method, according to one embodiment of the present invention.

An authentication method may comprise a login method, illustrated in FIG. 20. A login method 2000 may comprise creating one or more login keys, distributing one or more verification keys, verifying a verification key in a local database, and validating a verification process. Additionally, a login method 2000 may comprise communication between one or more first peers 2001, one or more servers 2050, and one or more second peers 2075.

A login method 2000 may comprise a first peer 2001, wherein the first peer may be configured to interact with a user. A first peer 2001 may request login 2002 and a login request 2002 may be transmitted to one or more servers 2050. A server 2050 may receive a login request 2002 and generate login data 2051. In some embodiments, login data 2051 may comprise a login salt 2024. A login salt may be made up of one or more characters comprising letters, numbers, symbols, or any combination thereof. In some embodiments, login data 2051 may comprise user selection objects. In other embodiments, login data 2051 may comprise one or more login salts 2024 and user selection objects, and any other data required for a login method 2000.

Creating one or more login keys may further comprise generating a server key 2005 and a client key 2006 from user input 2004. In some embodiments, a server key 2005 and a client key 2006 may be used to generate a login key 2099. In other embodiments, a server key 2005, a client key 2006, and at least login salt 2024 may be used to generate a login key 2099. Other embodiments may comprise different combinations of client keys 2006, server keys 2005, and login salts 2024 being used to generate login keys 2099. Some information, e.g. a client key 2006, a login salt 2024, may be stored in the memory 2008 of a first peer 2001. Further, creating one or more login keys may comprise transferring information from a first peer 2001 to a server 2050. In some embodiments, a login key 2099 and a server key 2005 are transferred to a server 2050.

Also shown in FIG. 20, distributing one or more verification keys may comprise receiving information from a first peer 2001 at a server 2050. In some embodiments, information received at a server 2050 may comprise a login key 2099 and a server key 2005. A server 2050 may generate a recipient code 2052. Further, a server 2050 may generate a sender code 2054. Even further, a server 2050 may generate a distribution code 2056. A server key 2005, recipient code 2052, and sender code 2054 may be used to generate a verification key 2062. In some embodiments, a verification key 2062 may be generated from one or more server keys 2005, recipient codes 2052, verification salts 2024 or sender codes 2054, or any combination therein. Some information, e.g. a recipient code 2052, a verification key 2062, may be stored in the database 2057 of a server 2050. In some embodiments, a verification key 2062 may not be stored in the database 2057 of a server 2050. Distributing one or more verification keys may further comprise transferring information from a server 2050 to at least one second peer 2075. In some embodiments, a verification key 2062 and a distribution code 2056 are transferred to at least one second peer 2075.

A login method 2000 may further comprise verifying one or more verification keys on a local database. Illustrated in FIG. 20, at least one second peer 2075 may receive information from a server 2050. In some embodiments, information may comprise a verification key 2062 and a distribution code 2056. In other embodiments, information may comprise a verification key 2062, a distribution code 2056, and a verification salt 2063. A second peer 2075 may use any combination of a distribution code 2056 and a verification key 2062 to locate and confirm that a corresponding distribution key may be stored in a memory 2078 of a second peer 2075. A stored distribution key may be used to generate confirmation key 2081. In some embodiments, a stored distribution key 2053 and a verification salt 2063 received from a server 2050 may be used to generate a confirmation key 2081. A second peer 2075 may transmit information to a server 2050, which may comprise any combination of a confirmation key 2081, a distribution code 2056, and any other information that may be necessary for a login method 2000.

Validating a verification process may comprise receiving information from a second peer 2075 and comparing received information against information stored in a database 2057 of a server 2050. In some embodiments, a server 2050 receives information from a second peer 2075. Information received may comprise a confirmation key 2081, a result, a distribution code 2056 and other information needed for storage or comparison of information by the server 2050 or for identification of the second peer 2075.

Figure 21:
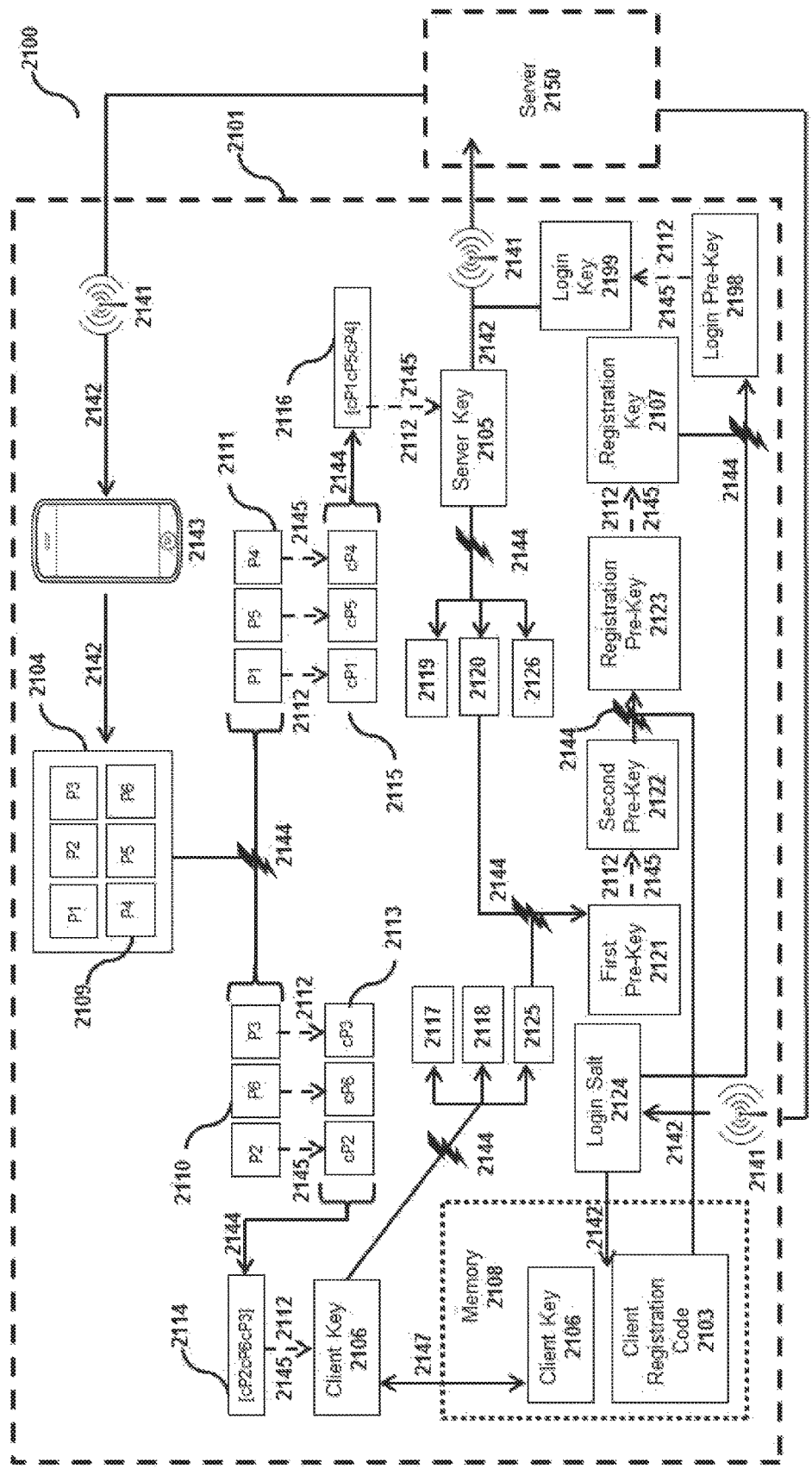
FIG. 21 illustrates a method of creating one or more keys, according to one embodiment of the present invention.

Shown in FIG. 21, creating one or more login keys 2100, according to some embodiments, may occur in a first peer 2101. A first peer 2101 may be any IoT device, i.e. any device that may connect to a network and have the ability to transmit data, including but not limited to cell phones, personal assistants, buttons, home security systems, appliances, and the like. A first peer 2101 may request login from a server 2150. According to some embodiments, a transmitter/receiver of a server 2150 may transmit login data to a first peer 2101. Login data may be received by a transmitter/receiver 2141 of a first peer 2101 and may comprise any data necessary to initiate a login method at a first peer 2101. In some embodiments, login data may comprise a login salt 2124. In other embodiments, login data may comprise a login salt 2124 and additional data which may serve as a precursor to user input 2104. A login salt 2124 may comprise a one or more strings of characters of any length.

Also shown in FIG. 21, user input 2104 may comprise any form of user-generated data which comprises discreet units of information. In some embodiments, user input 2104 comprises biometric data, e.g. fingerprint, iris, etc. In those embodiments, biometric data may be split into discreet units of information comprising identifiers. Identifiers may be converted into unique selection codes 2109.

In other embodiments, user input 2104 may comprise one or more selection objects. One or more selection objects may be images, icons, tokens, buttons, or any other object that allows a user to select one or more selection objects from a group of selection objects. Selection objects may be displayed on a visual display 2143 of a first peer 2101 and may be converted into selection codes 2109 which may comprise any number of characters, e.g. letters, numbers, symbols. In a specific embodiment, selection objects are images that may be received from a server 2150. Each image is assigned a unique selection code 2109, wherein user selection of a combination of selection objects produces a user input 2104 comprising a combination of selection codes 2109 that is unique to the user's selection of selection objects.

According to some embodiments, a user may generate user input 2104 comprising two or more selection codes 2109, wherein the number of selection codes is equal to n. Selection codes 2109 may be separated by a data manipulator 2144 into a first group 2110 and a second group 2111, wherein a first group 2110 comprises between one and n−1 selection codes 2109 and a second group 2111 comprises between one and n−1 selection codes 2109. Each selection code 2109 in a first group 2110 and a second group 2111 may be individually converted 2112 by a data converter 2145 into a one or more strings of characters, resulting in a first group of converted selection codes 2113 and a second group of converted selection codes 2115. In some embodiments, conversion 2112 may comprise using hash algorithms. In other embodiments, conversion 2112 may comprise using encryption methods. Yet other embodiments may comprise conversion 2112 using a combination of hash algorithms and encryption methods. A first group of converted selection codes 2113 may be used to generate a client pre-key 2114. Individual converted selection codes comprising a first group of converted selection codes 2113 may be combined by a data manipulator 2144 to form one or more strings of characters comprising a client pre-key 2114. In some embodiments, individual converted selection codes may be combined through concatenation of units. Concatenation may comprise using each of the individual converted selection codes as a unit or may comprise using pieces of each individual converted selection code as a unit. A client pre-key 2114 may be converted 2112 by a data converter 2145 to a client key 2106. In some embodiments, conversion 2112 may comprise using hash algorithms. In other embodiments, conversion 2112 may comprise using encryption methods. Yet other embodiments may comprise conversion 2112 using a combination of hash algorithms and encryption methods. A client key 2106 may be stored by a processing migrator 2147 in a memory unit 2108 of a first peer 2101. A client key 2106 generated by a login method may be compared by a processing verifier 2147 to a client key 2106 stored in a memory 2108 of a first peer 2101 during a registration process for identity.

A second group of converted selection codes 2115 may be used to generate a server pre-key 2116. Individual converted selection codes comprising a second group of converted selection codes 2115 may be combined by a data manipulator 2144 to form one or more strings of characters comprising a server pre-key 2116. In some embodiments, individual converted selection codes may be combined through concatenation of units. Concatenation may comprise using each of the individual converted selection codes as a unit or may comprise using pieces of each individual converted selection code as a unit. A server pre-key 2116 may be converted 2112 by a data converter 2145 to a server key 2105. In some embodiments, conversion 2112 may comprise using hash algorithms. In other embodiments, conversion 2112 may comprise using encryption methods. Yet other embodiments may comprise conversion 2112 using a combination of hash algorithms and encryption methods.

According to some embodiments, a login key 2199 may be generated. Each of a client key 2106 and a server key 2105 may be separated by a data manipulator 2144 into a client key first part 2117, a client key second part 2118, a server key first part 2119, and a server key second part 2120. A client key first part 2117 and a client key second part 2118 may comprise different portions of the characters that comprise a client key 2106. In a specific embodiment, each of a client key first part 2117 and a client key second part 2118 may be one half of a client key 2106. A server key first part 2119 and a server key second part 2120 may comprise different portions of the characters that comprise a server key 2105. In a specific embodiment, each of a server key first part 2119 and a server key second part 2120 may be one half of a server key 2105. A client key first part 2117, a client key second part 2118, a server key first part 2119, and a server key second part 2120 may be combined by a data manipulator 2144 through concatenation of units to form one or more strings of characters comprising a first pre-key 2121. Concatenation may comprise using each of a client key first part 2117, a client key second part 2118, a server key first part 2119, and a server key second part 2120 as a unit or may comprise using pieces of a client key first part 2117, a client key second part 2118, a server key first part 2119, and a server key second part 2120 as a unit.

A first pre-key 2121 may be converted 2112 by a data converter 2145 into a one or more strings of characters comprising a second pre-key 2122. In some embodiments, conversion 2112 may comprise using hash algorithms. In other embodiments, conversion 2112 may comprise using encryption methods. Yet other embodiments may comprise conversion 2112 using a combination of hash algorithms and encryption methods. A second pre-key 2122 may be used to generate a registration pre-key 2123. According to some embodiments, a second pre-key 2122 and a client registration code 2103 may be concatenated by a data manipulator 2144 to form one or more strings of characters comprising a registration pre-key 2123. Concatenation may comprise using each of a second pre-key 2122 and a client registration code 2103 as a unit or may comprise using pieces of a second pre-key 2122 and a client registration code 2103 as a unit. A client registration code 2103 may be stored in a memory 2108 of a first peer 2101 by a processing migrator 2142 during a registration process. A registration pre-key 2123 may be converted 2112 by a data converter 2144 into a one or more strings of characters comprising a registration key 2107. In some embodiments, conversion 2112 may comprise using hash algorithms. In other embodiments, conversion 2112 may comprise using encryption methods. Yet other embodiments may comprise conversion 2112 using a combination of hash algorithms and encryption methods. In some embodiments, a registration key 2107 may be identical to a registration key 1707 generated by a first peer 1701 during a registration method 1700, shown in FIG. 17. Referring back to FIG. 21, a registration key 2107 may be used to generate a login key 2199. In some embodiments, a registration key 2107 and a login salt 2124 are used to generate a login key 2199. A registration key 2107 and a login salt 2024 may be concatenated by a data manipulator 2144 to form one or more strings of characters comprising a login pre-key 2198. Concatenation may comprise using each of a registration key 2107 and a login salt 2024 as a unit or may comprise using pieces of a registration key 2107 and a login salt 2024 as a unit. A login pre-key 2198 may be used to generate a login key 2199. In some embodiments, a login pre-key 2198 may be converted 2112 by a data converter 2145 to a login key 2199. In some embodiments, conversion 2112 may comprise using hash algorithms. In other embodiments, conversion 2112 may comprise using encryption methods. Yet other embodiments may comprise conversion 2112 using a combination of hash algorithms and encryption methods.

A first peer 2101 may transmit information to a server 2150. According to some embodiments, a transmitter/receiver 2141 of a first peer 2101 may transmit a login key 2199 and a server key 2105 to a server 2150. In other embodiments, a transmitter/receiver 2141 of a first peer 2101 may transmit a login key 2199, a server key 2105, and other information necessary for a login method to a server 2150.

Figure 22:
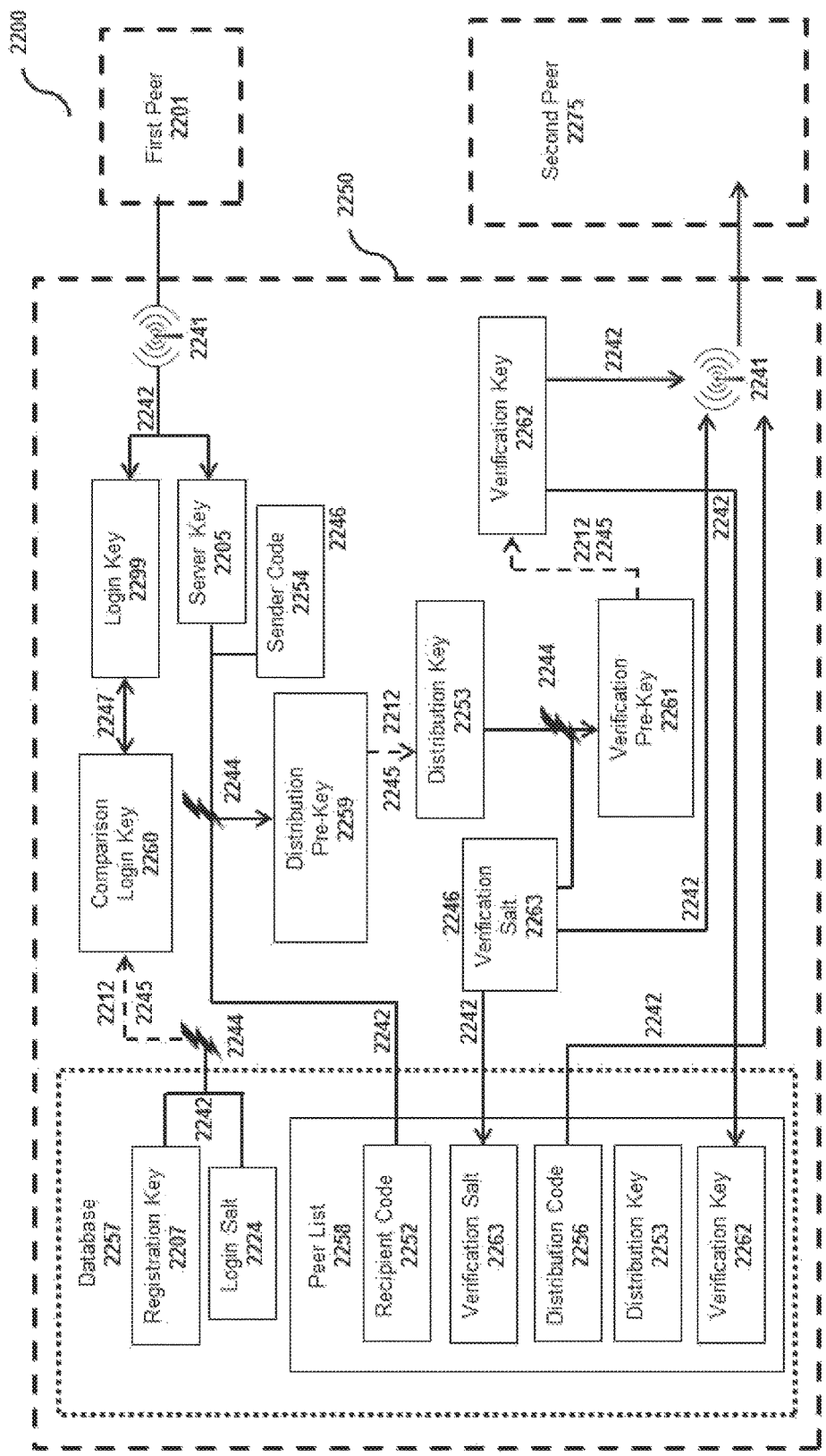
FIG. 22 illustrates a method of distributing one or more verification keys, according to one embodiment of the present invention.

A login method may further comprise distributing one or more verification keys. Illustrated in FIG. 22, a server 2250 may receive information from a first peer 2201. According to some embodiments, a transmitter/receiver 2241 of a server 2250 may receive a login key 2299 from a first peer 2201. A transmitter/receiver 2241 of a server 2250 may receive a server key 2205 from a first peer 2201. A transmitter/receiver 2241 of a server 2250 may receive both a login key 2299 and a server key 2205 from a first peer 2201. In some embodiments, a server 2250 may generate a comparison login key 2260. A comparison login key 2260 may be generated using a registration key 2207 that has been stored in a database 2257 of a server 2250 during a registration method. A processing migrator 2242 of a server 2250 may migrate a registration key 2207 and a login salt 2224 from a database 2257. A data manipulator 2244 of a server 2250 may combine a registration key 2207 and a login salt 2224 by concatenation to generate a comparison login pre-key. A comparison login pre-key may be converted 2212 by a data converter 2245 to a comparison login key 2260. In some embodiments, conversion 2212 may comprise using hash algorithms. In other embodiments, conversion 2212 may comprise using encryption methods. Yet other embodiments may comprise conversion 2212 using a combination of hash algorithms and encryption methods. A processing verifier 2247 of a server 2250 may compare a comparison login key 2260 to a login key 2299 sent by a first peer 2201 to determine if a first peer 2201 may be communicated with.

A login key 2299 may be stored in a database 2257 of a server 2250 by a processing migrator 2242. A server may access a previously stored peer list 2258 using a data migrator 2242. A stored peer list 2258 may comprise a list of peer devices, e.g. a first peer 2201, a second peer 2275, on the network. A peer list may also comprise recipient codes 2252 and distribution codes 2256, which may comprise a one or more strings of characters of any length. Additionally, a processing generator 2246 of a server 2250 may generate a sender code 2254, which may also comprise a one or more strings of characters of any length.

A data manipulator 2244 of a server 2250 may generate a distribution pre-key 2259 by combining any combination of a server key 2205, a recipient code 2252, a sender code 2254, a distribution code 2256, or a login key 2299. In some embodiments, a distribution pre-key 2259 is comprised of a server key 2205, a sender code 2254, and a recipient code 2252, which may be combined through concatenation of units to form one or more strings of characters. Concatenation may comprise using each of a server key 2205, a sender code 2254, and a recipient code 2252 as a unit or may comprise using pieces of a server key 2205, a sender code 2254, and a recipient code 2252 as a unit. A distribution pre-key 2259 may be converted 2212 by a data converter 2245 into a one or more strings of characters comprising a distribution key 2253. In some embodiments, conversion 2212 may comprise using hash algorithms. In other embodiments, conversion 2212 may comprise using encryption methods. Yet other embodiments may comprise conversion 2212 using a combination of hash algorithms and encryption methods. A distribution key 2253 may be stored in a database 2257 of a server 2250. A verification pre-key 2261 may be generated by a data manipulator 2244 of a server 2250. In some embodiments, a distribution key 2253 and a verification salt 2263, generated by a processing generator 2246 of a server 2250 and comprising any number of characters, may be concatenated to generate a verification pre-key 2261. A verification pre-key 2261 may be converted 2212 by a data converter 2245 into a verification key 2262.

In some embodiments, conversion 2212 may comprise using hash algorithms. In other embodiments, conversion 2212 may comprise using encryption methods. Yet other embodiments may comprise conversion 2212 using a combination of hash algorithms and encryption methods.

A server 2250 may be configured to transmit information to a second peer 2275. In some embodiments, a transmitter/receiver 2241 of a server 2250 may transmit a verification key 2262 and a distribution code 2256 to a second peer 2275. In other embodiments, a transmitter/receiver 2241 of a server 2250 may transmit a verification key 2262, a distribution code 2256, a verification salt 2263, and other information necessary for a login method 2000 to a second peer 2275. In some embodiments, a server 2250 may transmit any combination of a distribution key 2253, a verification salt 2263, and a distribution code 2256 to a second peer 2275.

A server 2250 may generate more than one verification keys 2262 and transmit data to more than one second peer 2275. In some embodiments, a peer list 2258 may comprise a list of more than one second peers 2275 on the network. A second peer may comprise any IoT device, server, or any device that is on a network and capable of transmitting and receiving data from a server 2250. A server 2250 may generate a unique distribution code 2256 for each second peer 2275. A server 2250 may generate a unique recipient code 2252 for each second peer 2275. In these embodiments, a verification key 2262 created for each second peer 2275 may be different from verification keys 2262 created for other second peers 2275, although underlying server keys 2205 received from a first peer 2201 may be identical. Verification keys 2262 may or may not be stored at a database 2257 of a server 2250.

Figure 23:
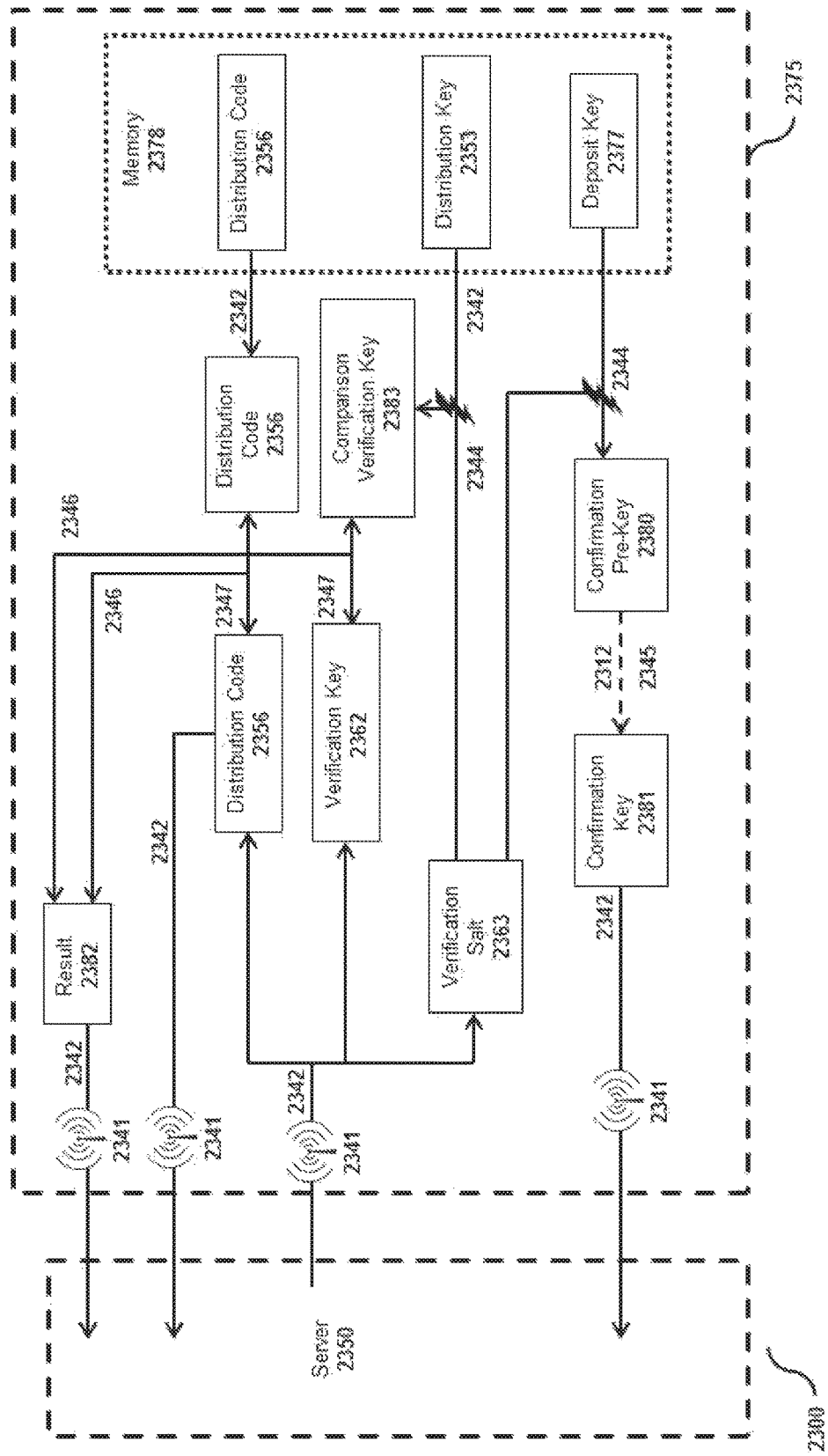
FIG. 23 illustrates a method of verifying a verification key in a local database, according to one embodiment of the present invention.

Referring now to FIG. 23, a login method may comprise verifying one or more login keys on a local database. According to some embodiments, a second peer 2375 may be configured to receive and transmit information to a server 2350. A transmitter/receiver 2341 of a second peer 2375 may receive a verification key 2362 from a server 2350. A transmitter/receiver 2341 of a second peer 2375 may receive a distribution code 2356 from a server 2350. In some embodiments, a transmitter/receiver 2341 of a second peer 2375 may receive a verification key 2362, a distribution code 2356, and verification salt 2363 from a server 2350. A distribution code 2356 may be compared by a processing verifier 2347 across all distribution codes 2356 stored in a memory 2378 of a second peer 2375. If a distribution code 2356 received from a server 2350 is identical to a distribution code 2356 stored in a memory 2378 of a second peer 2375, then a processing generator 2346 of a second peer 2375 may produce a result 2382 that is affirmative. If a distribution code 2356 received by a second peer 2375 is not identical to a distribution code 2356 stored in a memory 2378 of a second peer 2375, then a processing generator 2346 of a second peer 2375 may produce a result 2382 that is negative. In some embodiments, a verification key 2362 is also used to locate identical distribution codes 2356. If a second peer 2375 determines that one or more distribution codes 2356 stored in a memory 2378 of a second peer 2375 is identical to a distribution code 2356 received from a server 2350, then a processing migrator 2342 of a second peer 2375 may remove a distribution key 2353 that is associated with a matching distribution code 2356 from a memory 2378. A distribution key 2353 removed from a memory 2378 of a second peer 2375 and a verification salt 2363 may be used by a data manipulator 2344 to generate a confirmation pre-key 2380 by concatenation. A confirmation pre-key 2380 may be converted 2312 by a data converter 2345 to a confirmation key 2381. In some embodiments, conversion 2312 may comprise using hash algorithms. In other embodiments, conversion 2312 may comprise using encryption methods. Yet other embodiments may comprise conversion 2312 using a combination of hash algorithms and encryption methods.

In some embodiments, a second peer 2375 may receive a distribution key and a verification salt 2363 from a server 2350. A second peer 2375 may generate a verification key 2362 at a second peer 2375 by concatenation of a distribution key and a verification salt 2363 to generate a verification pre-key. A verification pre-key may be converted 2312 to a verification kay 2362.

In some embodiments, a second peer 2375 may generate a comparison verification key 2383. A second peer 2375 may generate a comparison verification key 2383 by concatenation of a stored distribution key 2353 and a verification salt 2363 received from a server 2350 to generate a comparison verification pre-key. A comparison verification pre-key may be converted 2312 to a comparison verification key. In some embodiments, a comparison verification key 2383 may be compared by a processing verifier 2347 to a received verification key 2362 and a result 2382 may be generated. In some embodiments, a result 2382 may comprise a result generated from comparing a verification key 2362 to a comparison verification key 2383 and a result generated from comparing a received distribution code 2356 to a stored distribution code 2356. A confirmation key 2381 may be generated from a verification salt 2363 and a deposit key 2377 retrieved from a memory 2378 of a second peer 2375. A deposit key 2377 and a verification salt 2363 may be concatenated by a data manipulator 2344 to generate a confirmation pre-key 2380. A confirmation pre-key 2380 may be converted 2312 to a confirmation key 2381. Any combination of a confirmation key 2381, a distribution code 2356, and a result 2382 may be transmitted from a second peer 2375 to a server 2350.

A second peer 2375 may be configured to transmit data to a server 2350. In some embodiments, a transmitter/receiver 2341 of a second peer 2375 may transmit any combination of a result 2382, a distribution code 2356, and a confirmation key 2381 to a server 2350. In some embodiments, a second peer 2375 may be configured to delete all data associated with a transaction. In a specific embodiment, a second peer 2375 may delete any combination of a distribution code 2356, a deposit key 2377, a distribution key 2353, a verification key 2362, a verification salt 2326, a confirmation pre-key 2380, and a confirmation key 2381 from a memory 2378 of a second peer 2375 or from a processor of a second peer 2375. In some embodiments, deletion of data may occur contemporaneously with transmitting data to a server 2350. In other embodiments, deletion of data may occur after transmitting data to a server 2350.

Figure 24:
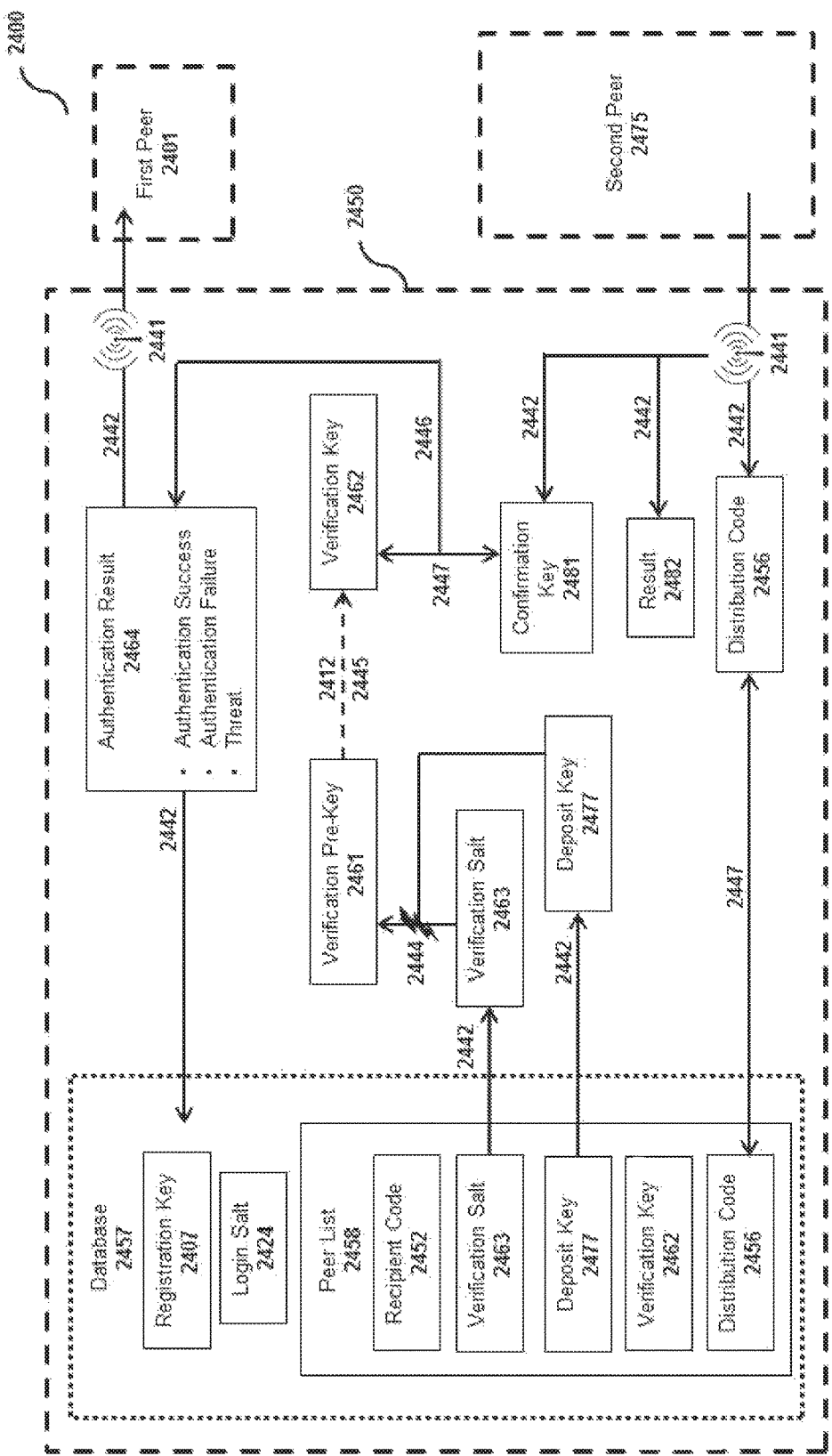
FIG. 24 illustrates a method of validating a verification process, according to one embodiment of the present invention.

Referring now to FIG. 24, a login method may further comprise validating a verification process 2400. A server 2450 may be configured to receive data from a one or more second peers 2475. In some embodiments, a transmitter/receiver 2441 of a server 2450 may receive any combination of a confirmation key 2481, a result 2482, and a distribution code 2456. A server 2450 may acknowledge a result 2482 received from a second peer 2475. In the event that a result is affirmative, a processing verifier 2447 of a server 2450 may compare a distribution code 2456 received from a second peer 2475 to all or some distribution codes 2456 stored in a database 2457 of a server 2450. If a distribution code 2456 stored in a database 2457 of a server 2450 is identical to a distribution code 2456 received from a second peer 2475, then a processing migrator 2442 of a server 2450 may retrieve any combination of a verification salt 2463 and a distribution key 2453 which may be associated with a distribution code 2456 and stored in a database 2457 of a server 2450. In some embodiments, a retrieved distribution key 2453 may be a distribution key 2453 which was stored during a registration process. A retrieved verification salt 2463 and a retrieved distribution key 2453 may be used by a data manipulator 2444 to generate a verification pre-key 2461 through concatenation of a verification salt 2463 and a distribution key 2453. A verification pre-key 2461 may be converted 2412 by a data converter 2445 to a verification key 2462. In some embodiments, conversion 2412 may comprise using hash algorithms. In other embodiments, conversion 2412 may comprise using encryption methods. Yet other embodiments may comprise conversion 2412 using a combination of hash algorithms and encryption methods.

A processing verifier 2447 of a server 2450 may compare a generated verification key 2462 to a confirmation key 2481 received from a second peer 2475 and a processing generator 2246 may produce an authentication result 2464. If a verification key 2462 is identical to a confirmation key 2481 received from a second peer 2475, a result might be affirmative, e.g. authentication success. If a verification key 2462 is not identical to a confirmation key 2481 received from a second peer 2475, then an authentication result 2464 may be negative, e.g. authentication failure or threat. A processing migrator 2442 of a server 2450 may store an authentication result 2464 in a database 2457. In some embodiments, an authentication result 2464 is stored with an associated distribution key 2453 generated during a registration method.

A server 2450 may send new distribution keys 2453 to one or more second peers 2475. Referring now to FIG. 19, a server 1950 may generate a new peer list 1958 in a database 1957 of a server 1950. In some embodiments, a server 1950 may assign any combination of a new recipient code 1952 and a new distribution code 1956 and use any combination of a new recipient code 1952 and a new distribution code 1956 to generate a new distribution key 1953, in a method which may be identical to distributing one or more distribution keys 1900. A server 1950 may transmit newly generated distribution keys 1953 to second peers 1975 which may be different from second peers 1975 which previously stored distribution keys 1953.

A web authentication method may comprise generating a bar code, generating one or more keys, and establishing a web session. Further, a web authentication system may comprise communication between one or more first devices, second devices, first servers, second servers, and internet applications. One or more first devices, second devices, first servers, and second servers may comprise at least a processor and a transmitter/receiver. One or more first devices and one or more second devices may additionally comprise a respective memory. In some embodiments, each of one or more first devices and one or second devices may comprise a visual display. Each of one or more first devices and one or second devices may comprise a means to scan a bar code. One or more first servers and second servers may additionally comprise a database.

A transmitter of a first device, a second device, a first server, and a second server may be configured to transmit and receive information from an exogenous source. In some embodiments, a first device may be configured to transmit and receive information from any combination of a second device, a first server, and a second server. A first server and a second server may be configured to transmit and receive information from both a first device and a second device, and a second device may be configured to transmit and receive information from a first server, a first device, and a second server. A memory of a first device and a second device and a database of a server may be configured to store information and to allow information to be retrieved. A visual display may additionally comprise a means for a user to interact with a display, e.g. enter data, select characters, select objects, etc. An internet application may be configured to transmit or receive information from any combination of a first server, a second server, a first device, and a second device.

A processor of a first device, a second device, a first server, and a second server may comprise a processing migrator, a data manipulator, a data converter, a processing generator, and a processing verifier. A processing migrator may be configured to migrate data from one component within a first device, a second device, or first or second server to another component within a first device, a second device, or a first or second server. By way of example, and not limitation, a processing migrator may be configured to move data from a memory of a first device to a processor of a first device, or from a processor of a second device to a transmitter/receiver of a second device. A data manipulator may be configured to manipulate data, e.g. combine, separate, separate and recombine, reorder, etc. By way of example, and not limitation, a data manipulator of a first device may be configured to separate a one or more strings of characters into a first portion and a second portion, or a data manipulator of a server may be configured to combine a first portion of data with a second portion of data to produce one or more strings of characters.

A data converter may be configured to convert a first string of characters into a second string of characters, wherein each of a first string of characters and a second string of characters may be different in any one or more of length, composition, or arrangement. In some embodiments, a data converter may be configured to apply hash algorithms to a first string of characters. In other embodiments, a data converter may be configured to apply encryption protocols to a first string of characters. In yet other embodiments, a data converter may be configured to apply decryption protocols to a first string of characters. In other embodiments still, a data converter may be configured to apply any combination of hash algorithms, encryption protocols, decryption protocols, or any other known method of data conversion to a first string of characters to produce a second string of characters.

A processing generator may be configured to produce data. In some embodiments, data may comprise a one or more strings of characters of any length and may comprise bar codes and the like. In some embodiments, data may be produced in a random manner or a directed manner. A processing verifier may be configured to compare two or more data and determine if those data are identical or different. In some embodiments, a processing verifier and a processing generator may be paired to determine if a first string of characters and a second string of characters are identical and generate a response based on the identity of a first and second string of characters.

Figure 25:
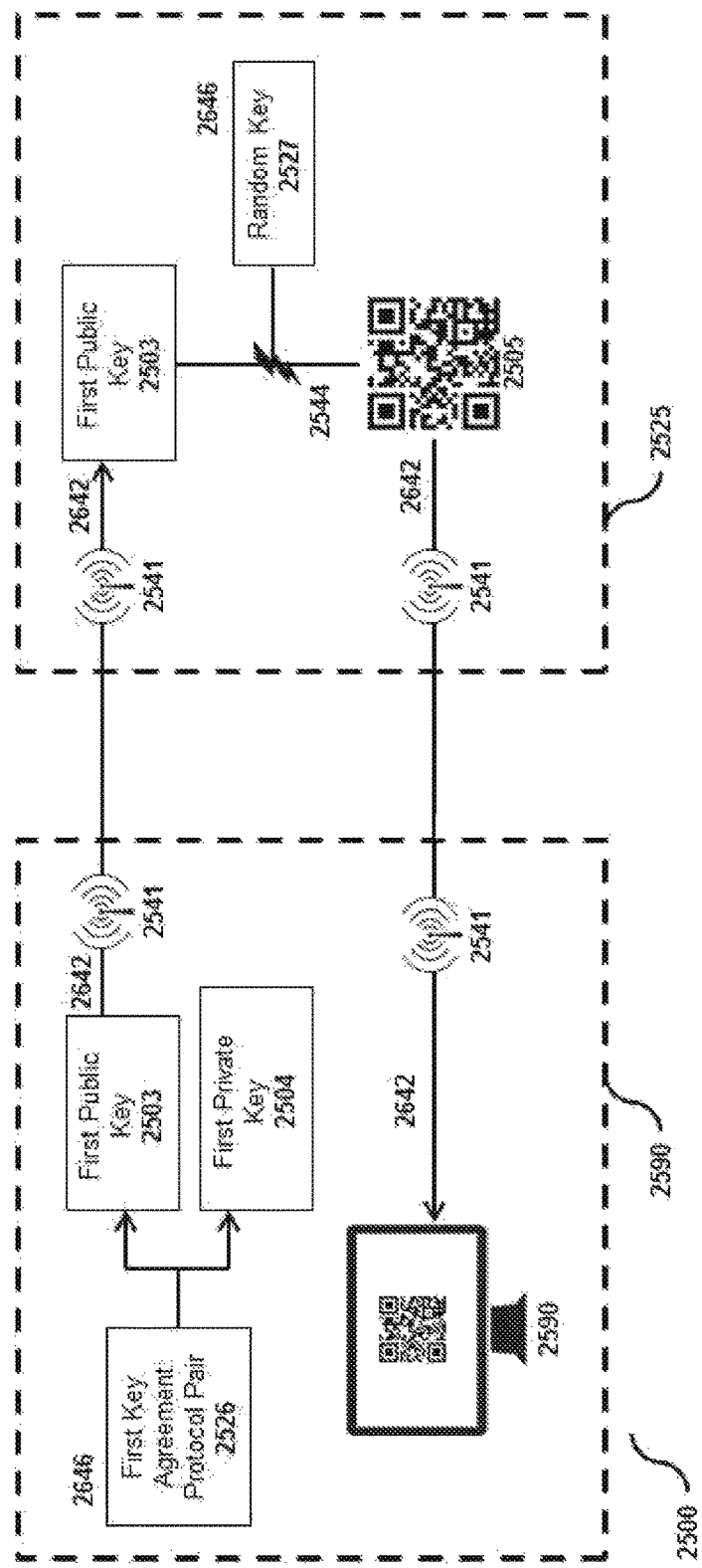
FIG. 25 illustrates a method of generating one or more bar codes, according to one embodiment of the present invention.

A web authentication method may comprise generating a bar code, illustrated in FIG. 25. Generating a bar code 2500 may be initiated at an internet application 2590. In some embodiments, a user may initiate generating a bar code 2500 at an internet application 2590 with a login request. A first agreement protocol pair 2646 may be generated by a processing generator 2646. In some embodiments, a first agreement protocol pair 2646 may be generated by a processing generator 2646 at an internet application 2590. A first key agreement protocol pair 2526 may comprise any key agreement protocol pair that is readily known to a person having ordinary skill in the art. In some embodiments, a first key agreement protocol pair 2526 may comprise an Elliptic-curve Diffie-Hellman (ECDH) pair. According to some embodiments, an internet application 2590 may be configured to transmit information to a first server 2525. A processing migrator 2642 may transfer information to a transmitter/receiver 2541 of an internet application 2590. An internet application 2590 may transmit any combination of a first public key 2503, a first private key 2504, and any other information necessary to generate a bar code 2505.

In some embodiments, a first server 2525 may be configured to receive information from an internet application 2590. A transmitter/receiver 2541 of a first server 2525 may receive any combination of a first public key 2503, a first private key 2504, and any other necessary information for generating a bar code 2500 from an internet application 2590. A first server 2525 may generate a random key 2527 and a random key 2527 may be generated by a processing generator 2646 of a first server 2525. A random key 2527 may comprise one or more strings of characters of any length and characters may comprise letters, numbers, and symbols. In some embodiments, a bar code 2505 may be generated.

A processing generator 2546 may use a bar code precursor to generate a bar code 2505. A bar code 2505 may comprise any type of barcode 2505, including without limitation any linear barcode, 2-dimensional bar code, or any type of readable indicia readily known to a person having ordinary skill in the art. In some embodiments, a bar code 2505 may comprise a QR code. A bar code 2505 may be generated from any combination of a first public key 2503, a first private key 2504, a random key 2527, and any other information necessary for generating a bar code 2500. In a specific embodiment, a bar code 2505 may be generated by a data manipulator 2544 of a first server 2525 and may be based on a first public key 2503 and a random key 2527. A first server 2525 may be configured to transfer information to an internet application 2590. In some embodiments, a transmitter/receiver 2541 of a first server 2525 may transmit information to an internet application 2590. In a specific embodiment, a first server 2525 may transmit a bar code 2505 to an internet application 2590. An internet application 2590 may receive a bar code 2505 at a transmitter/receiver 2541 and may display a bar code 2505 at a visual display 2590 of an internet application 2590.

Figure 26:
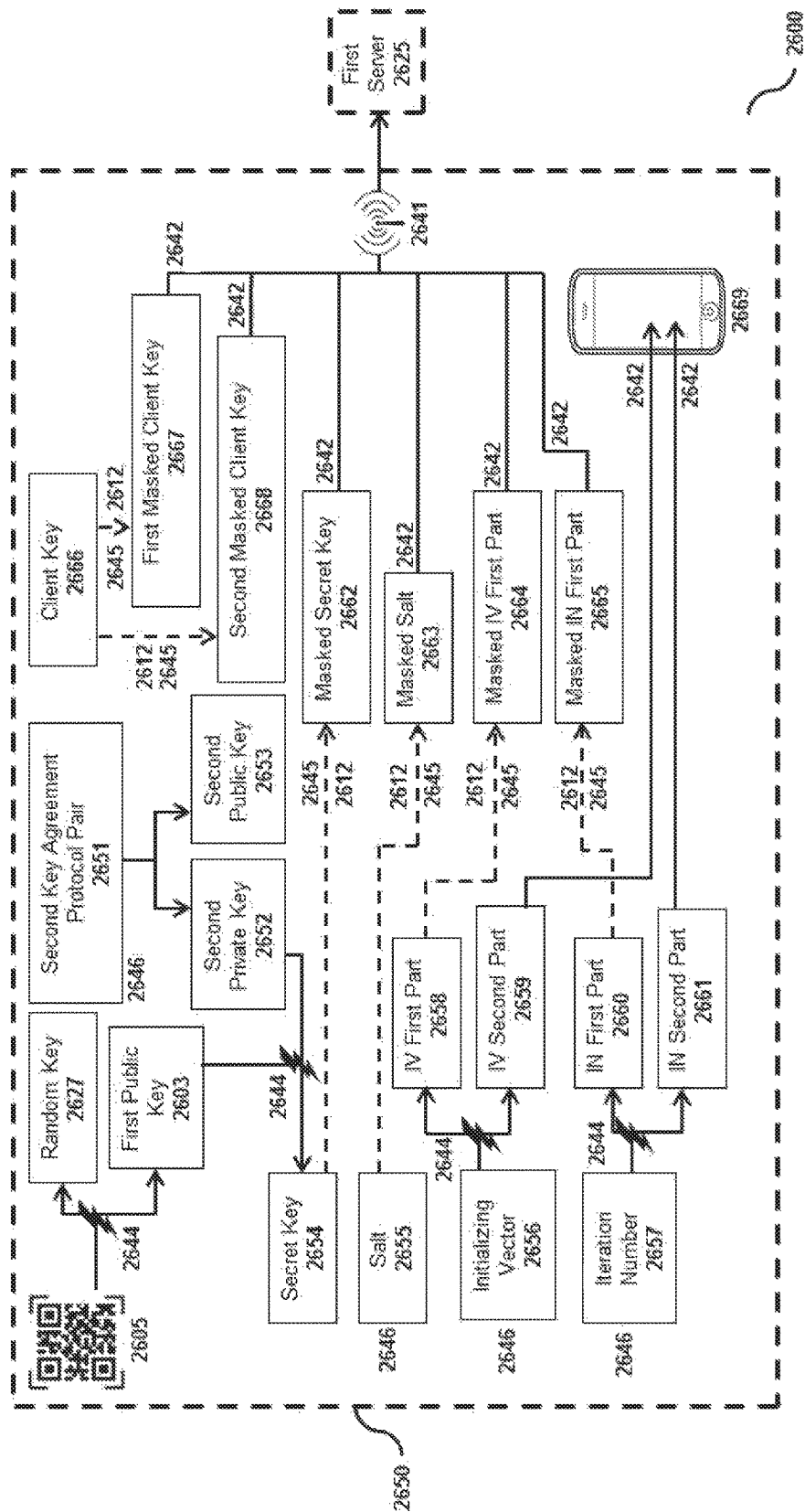
FIG. 26 illustrates a method of generating one or more keys, according to one embodiment of the present invention.
Figure 27:
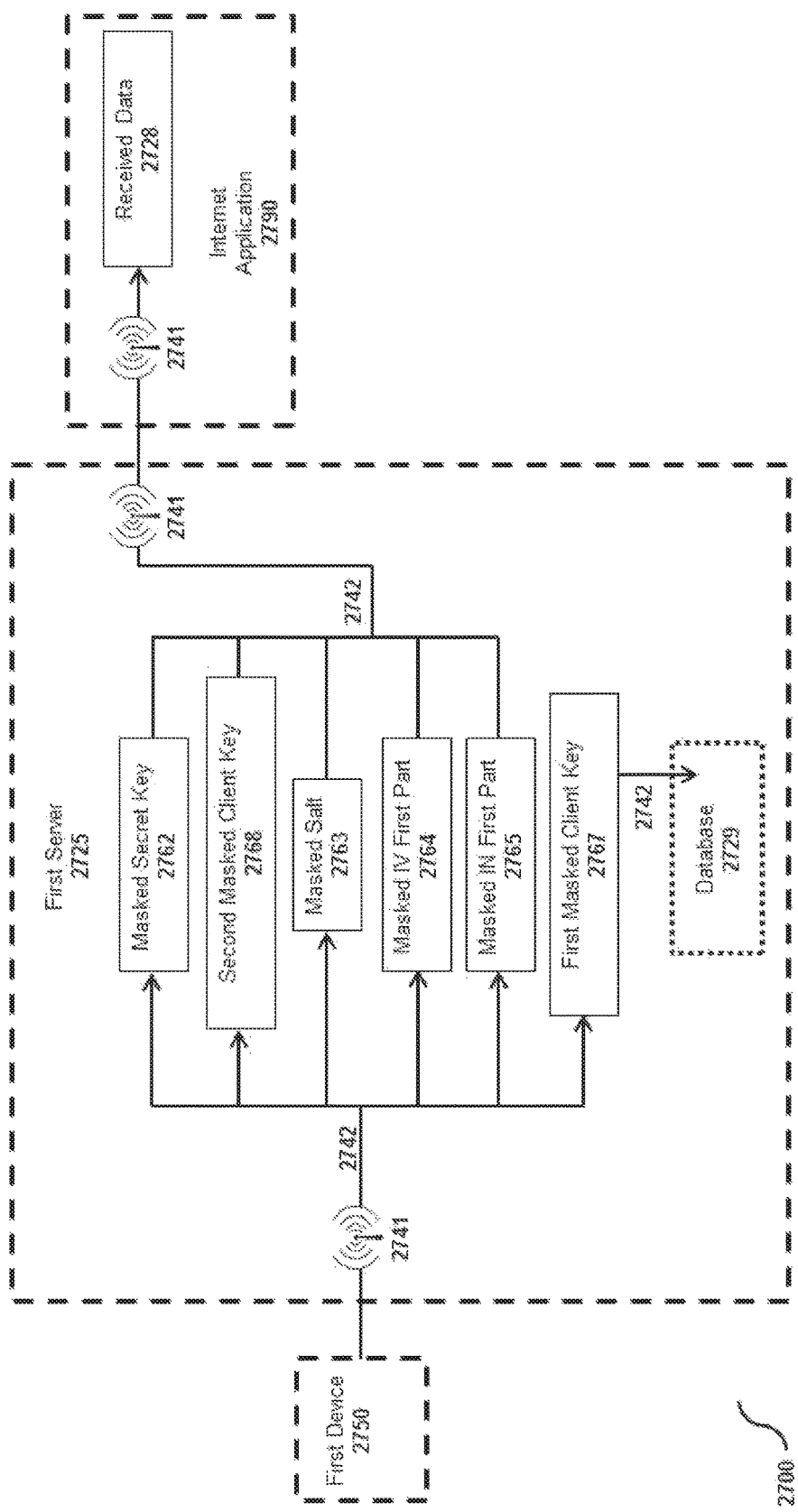
FIG. 27 illustrates a method of generating one or more keys, according to one embodiment of the present invention.
Figure 28:
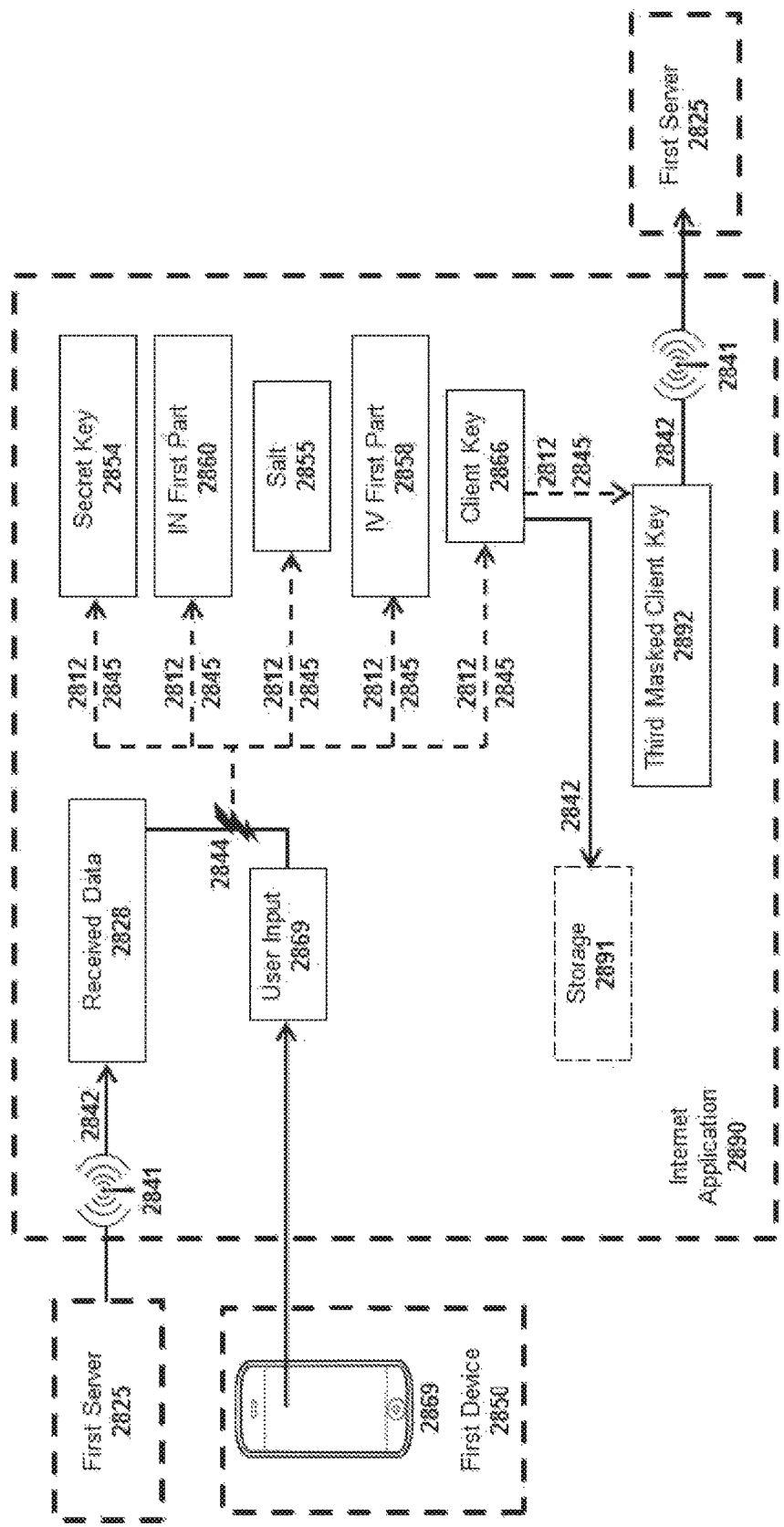
FIG. 28 illustrates a method of generating one or more keys, according to one embodiment of the present invention.

A web authentication method may comprise generating one or more keys, illustrated in FIGS. 26, 27, and 28. Referring now to FIG. 26, generating one or more keys 2600 may comprise a first device 2650 scanning a bar code 2605. A data manipulator 2644 of a first device 2650 may generate a random key 2627, a first public key 2603, or a random key 2627 and a first public key 2603 from information contained within a bar code 2605. A data manipulator 2644 may extrapolate any information contained within a bar code 2605 for the purpose of generating one or more keys 2600. Further, a processing generator 2646 of a first device 2650 may generate a second key agreement protocol pair 2651. A second key agreement protocol pair 2651 may comprise any key agreement protocol pair that is readily known to a person having ordinary skill in the art. In some embodiments, a second key agreement protocol pair 2651 may comprise an Elliptic-curve Diffie-Hellman (ECDH) pair. In some embodiments, a second key agreement protocol pair 2651 may comprise a second private key 2652 and a second public key 2653. A second private key 2652 and a first public key 2603 extrapolated from a bar code 2605 may be combined by a data manipulator 2644 to generate a secret key 2654. A processing generator 2646 of a first device 2650 may generate any combination of a salt 2655, an initializing vector 2656, and an iteration number 2657. In a specific embodiment, a processing generator 2646 of a first device 2650 may generate each of a salt 2655, an initializing vector 2656, and an iteration number 2657. A salt 2655, an initializing vector 2656, and an iteration number 2657, may respectively comprise a one or more strings of characters of any length and characters may comprise any combination of letters, numbers, or symbols. An initializing vector 2656 may comprise a number of characters equal to n, and may additionally comprise an IV first part 2658 and an IV second part 2659. An IV first part 2658 and an IV second part 2659 may each comprise a number of characters between one and n−1. An iteration number 2657 may comprise a number of characters equal to n, and additionally comprise an IN first part 2660 and an IN second part 2661. An IN first part 2660 and an IN second part 2661 may each comprise a number of characters between one and n−1. A data manipulator 2644 may produce an IV first part 2658 and an IV second part 2659 from an initializing vector 2656. A data manipulator 2644 may produce an IN first part 2660 and an IN second part 2661 from an iteration number 2657. According to some embodiments, a secret key 2654, a salt 2655, an IV first part 2658, and an IN first part 2660 may be converted 2612 by a data converter 2645 to a masked secret key 2662, a masked salt 2663, a masked IV first part 2664, and a masked IN first part 2665, respectively. In some embodiments, an initializing vector 2656 may be converted 2612 by a data converter 2645 to a masked IV first part 2664. Likewise, an iteration number 2657 may be converted 2612 by a data converter 2645 to a masked IN first part 2665. In some embodiments, conversion 2612 may comprise using hash algorithms. In other embodiments, conversion 2612 may comprise using encryption methods. Yet other embodiments may comprise conversion 2612 using a combination of hash algorithms and encryption methods. In some embodiments, an iteration number 2657 may remain intact, not generating an IN first part 2660 and an IN second part 2661 and a resulting IN first part 2660 may not be converted 2612.

A processing generator 2646 of a first device 2650 may generate a client key 2666. A client key 2666 may comprise a one or more strings of characters of any length and characters may comprise any combination of letters, numbers, or symbols. According to some embodiments, a client key 2666 may be converted 2612 by a data converter 2645 to a first masked client key 2667. In other embodiments, a client key 2667 may be converted 2612 by a data converter 2645 to a second masked client key 2668. In yet other embodiments, a client key 2666 may be converted 2612 by a data converter 2645 into each of a first masked client key 2667 and a second masked client key 2668. Conversion 2612 may comprise using hash algorithms. Additionally, conversion 2612 may comprise using encryption methods. In some embodiments, conversion 2612 may comprise a combination of hash algorithms and encryption methods. A first device 2650 may be configured to transmit information to a first server 2625. In some embodiments, a transmitter/receiver 2641 of a first device 2650 may transmit any combination of a first masked client key 2667, a second masked client key 2668, a masked secret key 2662, a masked salt 2663, a masked IV first part 2664, and a masked IN first part 2665 to a first server 2625. In some embodiments, a first device 2650 may display each of an IV second part 2659 and an IN second part 2661 on a visual display 2669 of a first device 2650. In a specific embodiment, an iteration number 2657 may be displayed in its entirety on a visual display 2669 of a first device 2650.

Referring now to FIG. 27, generating one or more keys may comprise a first server 2725 receiving information from a first device 2750. In some embodiments, a transmitter/receiver 2741 of a first server 2725 may receive any combination of a masked secret key 2762, a second masked client key 2768, a masked salt 2763, a masked IV first part 2764, a masked IN first part 2765, and a first masked client key 2767 from a first device 2750. In some embodiments, a processing migrator 2742 of a first server 2725 may store one or more of a masked secret key 2762, a second masked client key 2768, a masked salt 2763, a masked IV first part 2764, a masked IN first part 2765, and a first masked client key 2767 received from a first device 2750 in a database 2729 of a first server 2725. According to a specific embodiment, a processing migrator 2742 of a first server 2725 may store a first masked client key 2767 in a database 2729 of a first server 2729.

A first server 2725 may be configured to transmit information to an internet application 2790. In some embodiments, a transmitter/receiver 2741 of a first server 2725 may transmit any combination of a masked secret key 2762, a second masked client key 2768, a masked salt 2763, a masked IV first part 2764, a masked IN first part 2765, and a first masked client key 2767 to a first server 2725. In a specific embodiment, a transmitter/receiver 2741 of a first server 2725 may transmit a masked secret key 2762, a second masked client key 2768, a masked salt 2763, a masked IV first part 2764, and a masked IN first part 2765 to a first server 2725. In other embodiments, a transmitter/receiver 2741 of a first server 2725 may transmit any combination of a masked secret key 2762, a second masked client key 2768, a masked salt 2763, and a masked IV first part 2764 to an internet application 2790 (collectively referred to as "received data 2728" from this point forward).

Illustrated in FIG. 28, generating one or more keys 2800 may comprise a transmitter/receiver 2841 of an internet application 2890 receiving received data 2828 from a first server 2825. A first device 2850 may contain user input 2869, which may comprise an IV second part 2659 and an IN second part 2661 (see FIG. 26), which may respectively comprise strings of characters. User input 2869 may comprise an IV first part and an iteration number. In some embodiments, user input 2869 may be displayed on a graphical display 2869 of a first device 2850. Generating one or more keys may comprise user input 2869 being entered into an internet application 2890. A data converter 2844 of an internet application 2890 may convert 2812 received data 2828 into one or more of a secret key 2854, an IN first part 2860, a salt 2855, an IV first part 2858, and a client key 2866. Conversion 2812 may comprise using hash algorithms. Additionally, conversion 2812 may comprise using encryption methods. Conversion may comprise using decryption methods. In some embodiments, conversion 2812 may comprise any combination of hash algorithms, encryption methods, or decryption methods. According to some embodiments, a data converter 2844 of an internet application 2890 may use both user input 2869 and received data 2828 to convert 2812 received data 2828 into one or more of a secret key 2854, an IN first part 2860, a salt 2855, an IV first part 2858, and a client key 2866. A processing migrator 2842 may store a client key 2866 in a storage 2891 of an internet application 2890. A data converter 2845 of an internet application 2890 may convert 2812 a client key 2866 into a third masked client key 2892. In some embodiments, a third masked client key 2892 may be migrated by a processing migrator 2842 to a transmitter/receiver 2841 of an internet application 2890. A transmitter/receiver 2841 of an internet application 2890 may transmit a third masked client key 2892 to a first server 2825.

Figure 29:
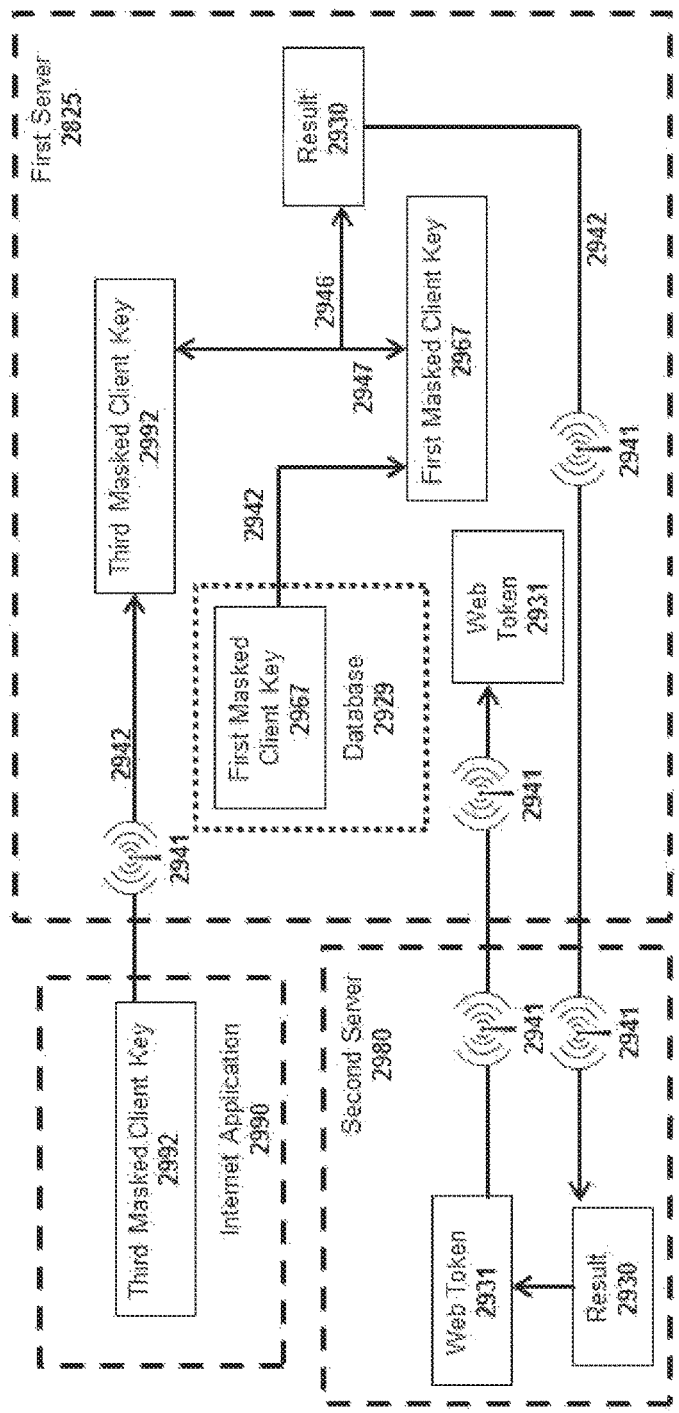
FIG. 29 illustrates a method of establishing a web session, according to one embodiment of the present invention.

A web authentication method may comprise establishing a web session. Illustrated in FIG. 29, a transmitter/receiver 2941 of a first server 2825 may receive a third masked client key 2992 from an internet application 2990. According to some embodiments, a processing migrator 2942 of a first server 2825 may retrieve a stored first masked client key 2967 from a database 2929 of a first server 2825. A processing verifier 2947 may compare a retrieved first masked client key 2967 to a third masked client key 2992 received from an internet application 2990. A processing generator 2946 may generate a result 2930 based on the identity of a first masked client key 2967 and a third masked client key 2992. A transmitter/receiver 2941 of a first server 2825 may transmit a result 2930 to a second server 2980. A transmitter/receiver 2941 of a second server 2980 may receive a result 2930 from a first server 2825 and generate a web token 2931. A web token 2931 may be generated by a processing generator 2946. In some embodiments, a web token 2931 may be any means known in the art for authorizing the establishment of a web session. A second server 2980 may transmit a generated web token 2931 to first server 2825. A transmitter/receiver 2941 of a first server 2825 may receive a web token 2931 from a second server 2980 and may transmit a received web token 2931 to an internet application 2990. A transmitter/receiver 2941 of an internet application 2990 may receive a web token 2931 from a first server 2825.

In some embodiments, an internet application may transmit a received web token to a second server. A second server may receive a web token from a web browser and may establish a web session. Further, a second server may be configured to transmit information to a first server. In some embodiments, a second server may transmit information regarding receipt of a web token from an internet application. Information regarding receipt of a web token from an internet application may comprise without limitation any information about the internet application, information about a user of an internet application, information about access to a web session, spatial and/or temporal information about any component of a system described herein. A first server may receive information regarding receipt of a web token from a second server. In some embodiments, a first server may be configured to transmit information to a first device, including without limitation, information regarding receipt of a web token.

It will be appreciated by those skilled in the art that other variations of the embodiments described herein may also be practiced without departing from the scope of the invention. Other modifications are therefore possible.

The invention claimed is:

1. A method of generating, distributing, and storing keys to authenticate identity, the method comprising the steps of:
receiving, at a server, a registration request from a first peer;
transmitting, in response to the receipt of the registration request, registration data from the server to the first peer, the registration data comprising at least a client registration code;
receiving a registration key and a server key, at the server, wherein the registration key and the server key are generated by the first peer;
generating, at the server, a sender code, a recipient code, a distribution code, and a peer list, the peer list comprising the recipient code and the distribution code;
generating a distribution key, the distribution key being based on the recipient code, the server key, and the sender code;
storing, at one or more databases associated with the server, the registration key, the distribution key, and the peer list;
transmitting, from the server, the distribution key and the distribution code to a second peer;
receiving, at the server, the distribution code and a deposit key from the second peer; and
storing, in the peer list at the one or more databases associated with the server, the distribution code and the deposit key received from the second peer.

2. The method of claim 1, wherein the first peer is configured for:
receiving the registration data from the server;
receiving user input, the user input comprising two or more selection codes;
separating the two or more selection codes into at least a first group of selection codes and a second group of selection codes;
generating a client key from the first group of selection codes;
generating the server key from the second group of selection codes;
generating, from the client key, at least a client key first part and a client key second part;
generating, from the server key, at least a server key first part and a server key second part;
generating the registration key, the registration key being based on the client key, the server key, and the client registration code;
storing, in a memory of the first peer, the client key and the client registration code; and
transmitting, to the server, at least the registration key and the server key.

3. The method of claim 2, wherein the user input comprises one or more of biometric data, spatial data, and temporal data.

4. The method of claim 2, wherein generating the client key from the first group of selection codes comprises:
converting individual selection codes comprising the first group of selection codes into a group of converted selection codes;
concatenating each individual converted selection code comprising the group of converted selection codes into one or more strings of characters comprising a client pre-key; and
converting the client pre-key into the client key.

5. The method of claim 2, wherein generating the server key from the second group of selection codes comprises:
converting individual selection codes comprising the second group of selection codes into a group of converted selection codes;
concatenating each individual converted selection code comprising the group of converted selection codes into one or more strings of characters comprising a server pre-key; and
converting the server pre-key into the server key.

6. The method of claim 2, wherein generating the registration key comprises:

concatenating at least one of the client key first part and the client key second part, and at least one of the server key first part and the server key second part to generate one or more strings of characters comprising a first pre-key;

converting the first pre-key into a second pre-key;

concatenating the second pre-key and the client registration code to generate one or more strings of characters comprising a registration pre-key; and converting the registration pre-key into the registration key.

7. The method of claim 1, wherein the registration data comprises a group of selection objects.

8. The method of claim 1, wherein the receiving the distribution code and the deposit key from the second peer further comprises the second peer being configured for:

receiving, from the server, the distribution code and the distribution key;

generating a deposit code and the deposit key, the deposit key being based on the deposit code and the distribution key;

storing, in a memory of the second peer, the distribution key, the deposit key, and the distribution code; and transmitting, to the server, the deposit key and the distribution code.

9. The method of claim 8, wherein generating the deposit key comprises:

concatenating the distribution key and the deposit code into one or more strings of characters comprising a deposit pre-key; and converting the deposit pre-key into the deposit key.

10. The method of claim 1, wherein generating the distribution key comprises:

concatenating one or more of the server key, the registration key, the sender code, and the recipient code into one or more strings of characters comprising a distribution pre-key; and converting the distribution pre-key into the distribution key.

11. A method of using keys to authenticate identity, the method comprising the steps of:

receiving a login request, at a server, from a first peer;

generating a login salt at the server;

storing the login salt in one or more databases associated with the server;

transmitting login data from the server to the first peer, the login data comprising at least the login salt;

receiving, at the server, a login key and a server key from the first peer;

retrieving, from the one or more databases associated with the server, a stored registration key, the login salt, a recipient code, and a distribution code;

generating, at the server, a comparison login key, wherein the comparison login key is based on the stored registration key and the login salt;

comparing, at the server, the comparison login key and the login key received from the first peer;

generating, at the server, a sender code and a verification salt;

generating, at the server, a distribution key, wherein the distribution key is based on at least the server key received from the first peer, the sender code, and the recipient code;

generating, at the server, a verification key, wherein the verification key is based one or more of the server key, the stored registration key, the sender code, the recipient code, and the verification salt;

storing, in a peer list, the verification key and the verification salt;

transmitting, from the server to a second peer, the verification key, the verification salt, and the distribution code;

receiving at the server, the distribution code and a confirmation key from the second peer;

comparing the distribution code received from the second peer to distribution codes stored at the one or more databases associated with the server;

retrieving a stored distribution key and the verification salt from the one or more databases associated with the server;

generating a second verification key based on the stored distribution key and the verification salt;

comparing the confirmation key received from the second peer to the second verification key; and generating an authentication result.

12. The method of claim 11, wherein the first peer is configured for:

receiving the login data from the server;

receiving user input, the user input comprising two or more selection codes;

separating the two or more selection codes into a first group of selection codes and a second group of selection codes;

generating a client key from the first group of selection codes;

generating the server key from the second group of selection codes;

generating, from the client key, at least a client key first part and a client key second part;

generating, from the server key, at least a server key first part and a server key second part;

retrieving, from a memory of the first peer, a stored client registration code;

generating a registration key, the registration key being based on the client key, the server key, and the client registration code;

generating the login key based on the registration key;

storing, in the memory of the first peer, the client key; and transmitting, to the server, at least the login key and the server key.

13. The method of claim 12, wherein the user input comprises at least one of biometric data, spatial data, and temporal data.

14. The method of claim 11, wherein the login data comprises the login salt and a group of selection objects.

15. The method of claim 11, wherein the second peer is configured for:

receiving, from the server, the distribution code, the verification key, and the verification salt;

comparing the distribution code received from the server to distribution codes stored in a memory of the second peer;

retrieving, from the memory of the second peer, a stored distribution key;

generating the confirmation key, the confirmation key being based on the stored distribution key and the verification salt; and transmitting, to the server, the distribution code and the confirmation key.

16. A method of generating a web token, said method comprising the steps of:

receiving, at a first server, a login request and a first public key;

transmitting or enabling access of, in response to the login request, from or by the first server to an internet application, a readable indicia, the readable indicia being based on a random key and the first public key, the internet application being configured to:
    receive the readable indicia from the first server;
    display the readable indicia, a first device being configured to:
        generate, at the first device, a client key; and
        convert the client key into a first masked client key and a second masked client key;
receiving or accessing, from the first device, the first masked client key and the second masked client key;
storing at least one of the first masked client key and the second masked client key in one or more databases associated with the first server;
transmitting or enabling access of the second masked client key to or by the internet application, the internet application being configured to:
    receive, from the first server, the second masked client key;
    convert the second masked client key into the client key; and
    convert the client key into a third masked client key;
receiving or accessing the third masked client key from the internet application;
retrieving the at least one of the first masked client key and the second masked client key stored in the one or more databases associated with the first server;
comparing the third masked client key to the at least one of the first masked client key and the second masked client key;
generating, at the first server, a result; and
transmitting or enabling access of the result, from or by the first server to a second server, the second server being configured to:
    receive the result from the first server;
    generate, at the second server, a web token.

17. The method of claim 16, wherein the first device is configured to:
    generate, at the first device, an initializing vector, the initializing vector (IV) comprising an IV first part and an IV second part;
    generate, at the first device, an iteration number;
    generate a masked IV first part from the IV first part; and
    display the IV second part and the iteration number at a visual display of the first device,
    the masked IV first part from the first device being caused to be transmitted to the first server.

18. The method of claim 17, wherein the internet application is configured to:
    receive, from the first server, the web token;
    transmit or enable access of, from the internet application to the second server, the web token, wherein the second server is configured to:
        receive the web token from the internet application; and
        initiate a web session.

19. A system comprising a server, the server comprising:
a memory comprising server instructions; and
a processing device configured for executing the server instructions, wherein the server instructions cause the processing device to perform operations of:
    receiving, at the server, a registration request from a first peer;
    transmitting, in response to the receipt of the registration request, registration data from the server to the first peer, the registration data comprising at least a client registration code;
    receiving a registration key and a server key, at the server, wherein the registration key and the server key are generated by the first peer;
    generating, at the server, a sender code, a recipient code, a distribution code, and a peer list, the peer list comprising the recipient code and the distribution code;
    generating a distribution key, the distribution key being based on the recipient code, the server key, and the sender code;
    storing, at one or more databases associated with the server, the registration key, the distribution key, and the peer list;
    transmitting, from the server, the distribution key and the distribution code to a second peer;
    receiving, at the server, the distribution code and a deposit key from the second peer; and
    storing, in the peer list at the one or more databases associated with the server, the distribution code and the deposit key received from the second peer.

20. The system of claim 19, wherein the server instructions further cause the processing device to perform the operations of:
    receiving a login request, at the server, from the first peer;
    generating a login salt at the server;
    storing the login salt at the one or more databases associated with the server;
    transmitting login data from the server to the first peer, the login data comprising at least the login salt;
    receiving, at the server, a login key and the server key from the first peer;
    retrieving, from the one or more databases associated with the server, a stored registration key, the login salt, the recipient code, and the distribution code;
    generating, at the server, a comparison login key, wherein the comparison login key is based on the stored registration key and the login salt;
    comparing, at the server, the comparison login key and the login key received from the first peer;
    generating, at the server, a sender code and a verification salt;
    generating, at the server, a distribution key, wherein the distribution key is based on at least the server key received from the first peer, the sender code, and the recipient code;
    generating, at the server, a verification key, wherein the verification key is based on the server key, the sender code, the recipient code, and the verification salt;
    storing, at a peer list of the server, the verification key and the verification salt;
    transmitting, from the server to a second peer, the verification key, the verification salt, and the distribution code;
    receiving at the server, the distribution code and a confirmation key from the second peer;
    comparing the distribution code received from the second peer to distribution codes stored at the one or more databases associated with the server;
    retrieving a stored distribution key and the verification salt from the one or more databases associated with the server;
    generating a second verification key based on the stored distribution key and the verification salt;

comparing the confirmation key received from the second peer to the second verification key; and
generating an authentication result.

\* \* \* \* \*